US012762680B2

(12) United States Patent
Senn et al.

(10) Patent No.: US 12,762,680 B2
(45) Date of Patent: Oct. 13, 2026

(54) TRANSFER LEARNING METHODS AND MODELS FACILITATING DEFECT DETECTION

(71) Applicant: Cepheid, Sunnyvale, CA (US)

(72) Inventors: Melanie Senn, Sunnyvale, CA (US); Aristotelis Fotkatzikis, Sunnyvale, CA (US)

(73) Assignee: Cepheid, Sunnyvale, CA (US)

( * ) Notice: Subject to any disclaimer, the term of this patent is extended or adjusted under 35 U.S.C. 154(b) by 236 days.

(21) Appl. No.: 18/460,279

(22) Filed: Sep. 1, 2023

(65) Prior Publication Data

US 2024/0177288 A1 May 30, 2024

Related U.S. Application Data

(60) Provisional application No. 63/374,314, filed on Sep. 1, 2022.

(51) Int. Cl.
*G06T 7/00* (2017.01)

(52) U.S. Cl.
CPC .. *G06T 7/0004* (2013.01); *G06T 2207/20081* (2013.01); *G06T 2207/20084* (2013.01); *G06T 2207/30108* (2013.01)

(58) Field of Classification Search
CPC ......... G06T 7/0004; G06T 2207/20081; G06T 2207/20084; G06T 2207/30108
(Continued)

(56) References Cited

U.S. PATENT DOCUMENTS 6,374,684 B1 * 4/2002 Dority ...................... B01L 3/502 73/864.81
8,048,386 B2 * 11/2011 Dority ..................... G01N 1/405 422/500
(Continued)

FOREIGN PATENT DOCUMENTS

WO WO-2022160040 A1 * 8/2022 ............. G06N 3/047

OTHER PUBLICATIONS

Chernytska, O. et al., "Explainable Defect Detection Using Convolutional Neural Networks: Case Study Towards Data Science", Dec. 12, 2021; retrieved from Internet: https:towardsdatascience.com/explainable-defect-detection-using convolutional-neural-networks-case-study-284e57337b59.
(Continued)

*Primary Examiner* — Sheela C Chawan
(74) *Attorney, Agent, or Firm* — Merchant & Gould P.C.

(57) ABSTRACT

Methods and systems for training a model for automated defect detection of a product during manufacturing are provided herein. Such methods utilize a combination of supervised transfer learning through auxiliary tasks and a combination of supervised and unsupervised learning. The methods can utilize supervised transfer learning with expert labels on a generalized auxiliary task, such as product classification, which is transferred to more specific auxiliary tasks, such as identification of specific product features and/or anomaly detection, where additional expert labels are then applied to the anomalies, and another iteration of supervised learning further improves the model. The anomalies can correspond to features associated with defects, which can be induced experimentally to improve efficiency of the training procedure. The product can be a sample cartridge such that the model allows detection of faulty
(Continued)

cartridges based on sample cartridge and/or manufacturing process data.

12 Claims, 20 Drawing Sheets

(58) Field of Classification Search
USPC .................................................. 382/100, 141
See application file for complete search history.

(56) References Cited

U.S. PATENT DOCUMENTS

| | | | | |
|---|---|---|---|---|
| 2003/0162304 | A1* | 8/2003 | Dority | G01N 1/405<br>436/164 |
| 2014/0025809 | A1 | 1/2014 | Steuperaert | |
| 2022/0214243 | A1* | 7/2022 | Li | G01N 21/8806 |

OTHER PUBLICATIONS

Gabriel Michau et al., "Unsupervised Transfer Learning for Anomaly Detection: Application to Complementary Operating Condition Transfer", Arxiv.Org, Cornell University Library, Nov. 24, 2020.
International Search Report and Written Opinion for International Application No. PCT/US2023/031905 dated Dec. 8, 2023.
Urwa Muaz et al., "Transfer Learning From an Auxiliary Discriminative Task for Unsupervised Anomaly Detection", Arixv.Org, Cornell University Library, Dec. 5, 2019.
Wischow et al., Calibration and Validation of a Stereo Camera System Augmented With a Long-Wave Infrared Module To Monitor Ultrasonic Welding of Thermoplastics, ISPRS Annals of the Photogrammetry, Remote Sensing and Spatial Information Sciences, vol. V-1-2022 XXIV ISPRS Congress (2022 edition), Jun. 6-11, 2022, Nice, France, 8 pages.
Nazir, Online Tool Condition Monitoring for Ultrasonic Metal Welding Via Sensor Fusion and Machine Learning, Thesis submitted to University of Illinois at Urbana-Champaign, 2020, 41 pages.
Pommer, Limits and Potential of Thermography for Quality Assurance in Ultrasonic Welding, www.ndt.net/?id=25488, 2020, Special issue "NDT today" as a replacement for the cancelled DGZfP Annual Conference 2020 (DGZfP 2020), 2 pages (58). Machine translated by Google.
Balz et al., Process Monitoring of Ultrasonic Metal Welding of Battery Tabs Using External Sensor Data, Journal of Advanced Joining Processes 1 (2020) 100005, www.elsevier.com/locate/jajp, Jan. 28, 2020, 11 pages.
Raad et al., Investigation of the Applicability of Acoustic Emission and Vibration Analysis To Describe the Thermo-Mechnaical Mechanism During Ultrasonic Metal Welding, 23rd International Congress on Acoustics in Aachen, Germany, Sep. 9-13, 2019, 8 pages (4700-4707).

* cited by examiner

1000 csv file (for import to DataRobot and Vidi)

| Image (cart id) | Binary label | Multi-class label |
|---|---|---|
| DSJ_002.bmp | FAIL | wrinkled film cloudy |
| DSJ_003.bmp | PASS | no_defect |
| DSJ_003.bmp | FAIL | cloudy |

1200

TRANSFER LEARNING METHODS AND MODELS FACILITATING DEFECT DETECTION

CROSS-REFERENCES TO RELATED APPLICATIONS

This application is a Non-Provisional of and claims the benefit of priority of U.S. Provisional Application No. 63/374,314 filed Sep. 1, 2022, which is incorporated herein by reference in its entirety.

This application is generally related to U.S. Non-Provisional application Ser. No. 18/460,253 entitled "SEAL FAILURE DETECTION SYSTEMS AND METHODS," and U.S. Non-Provisional Application No. 18/460,266 entitled "FAULTY UNIT DETECTION SYSTEM AND METHODS,"; filed concurrently herewith, the entire contents of each are incorporated herein by reference for all purposes.

FIELD OF THE INVENTION

The present invention relates generally to the field of defect detection in product manufacturing, particularly biological equipment, such as sample cartridges configured for analysis of a fluid sample.

BACKGROUND OF THE INVENTION

In recent years, there has been considerable development in the field of biological testing devices that facilitate manipulate a fluid sample within a sample cartridge for biological testing of a fluid sample by polymerase chain reaction (PCR). One notable development in this field is the GeneXpert sample cartridge by Cepheid. The configuration and operation of these types of cartridges can be further understood by referring to U.S. Pat. No. 6,374,684 entitled "Fluid Control and Processing System," and U.S. Pat. No. 8,048,386 entitled "Fluid Processing and Control." While these sample cartridges represent a considerable advancement in the start of the art, as with any precision instrument, there are certain challenges in regard to manufacturing of the sample cartridge, in particular the assembly of multiple components in a precision, pressurized instrument can occasionally result in defects that cause the sample cartridge to leak or unable to maintain internal pressure needed for successful operation.

Conventional systems for manufacturing sample cartridges utilize a series of manufacturing process and steps, some of which employ processes that can introduce defects into the sample cartridge, for example defects that cause the sample cartridge to leak or unable to maintain internal pressure, commonly known as seal failures. Certain steps, such as welding of a lid apparatus onto a cartridge body and film sealing of reagents in the cartridge, can introduce defects in sealing that are difficult to detect. Existing approaches to detecting these defects include various seal testing approaches and visual inspections, however, these approaches often utilize destructive methods and/or occasionally fail to identify all defects. Further, these approaches often test a number of cartridges in a certain lot, and if defects are detected, the entire lot is scrapped, which causes considerable waste of cartridges to ensure defective cartridges do not reach the end user. Additionally, current inspection methods are not always consistent due to human error. Accordingly, there exists a need for improved methods of defect detection methods that are non-destructive and do not require extensive testing post-manufacture and that are not prone to human errors associated with visual inspection methods. There is further need for such defect detection methods that are automated.

Accordingly, to achieve these goals there is a need to develop high accuracy models by which the product and manufacturing process can be analyzed to detect defects during manufacturing. Given the complexity and breadth of data relating to a given product and associated manufacturing processes, machine learning models are a useful tool to develop such models however, the development of a high-accuracy models presents considerable challenges, particularly given the limited data sets associated with product defects. Thus, there is a need for robust, high accuracy models for defect detection and methodologies to develop these highly sensitive and specific models to ensure low false negative (e.g. not missing defects/all defects are detected) and at the same time ensure low false positives (e.g. not over-rejecting good products).

BRIEF SUMMARY OF THE INVENTION

In one aspect, the invention pertains to methods of training a model for defect detection of product defects. Such training methods can include a combination of: supervised transfer learning through auxiliary tasks, and a combination of supervised and unsupervised learning.

In another aspect, such model training methods can includes steps of: performing supervised transfer learning on a plurality of data sets from acceptable products, where the plurality of data sets include expert labels; performing active learning on a plurality of data sets including both acceptable products and fail products having defects and identifying anomalies; providing additional expert labels for the identified anomalies; and performing supervised transfer learning with the expert labels on both the acceptable products and the fail products having defects. In some embodiments, the recited steps are associated with a first task, and the method is repeated for a second task that is more specific than the first task, and this approach can be repeated, each time with a more specific task. In some embodiments, the first task comprises determination of threshold for upper and lower range limits of the product. The thresholds can pertain to any of: feature maps, activations, predictions, and operational parameters. In some embodiments, the first task is identification of a product feature, and the second task is identification of an attribute of that feature. In some embodiments, the product is a sample cartridge configured for analyzing a sample. The first task can be identification of a feature and the second task can be an attribute of the feature. The feature can be any of a chimney, a weld between a lid and cartridge body, or a film seal on the lid. In some embodiments, the method repeats the same steps when additional data sets from both acceptable products and fail products having defects become available. The model can be configured for use within an automated defect detection of a sample cartridge during manufacture.

In still another aspect, the training methods can include steps of: performing a product classification step utilizing image data from acceptable products, where the image data includes expert labels; performing an experimental failure classification step on a second set of image data that includes both acceptable products and fail products having experimental defects and identifying anomalies; and performing a production failure classification step on a third set of image data that includes standard products including both acceptable products and products with standard production defects.

In some embodiments, the product classification step develops a relational algorithm, which is transferred to and updated in the experimental failure classification, which in turn is transferred to and updated in the production failure classification step. In some embodiments, the method further utilizes a pre-trained classifier configured to identify generic features from an image data set, where a relational algorithm associated therewith is transferred to and updated by the cartridge classifier. In some embodiments, the method can include inducing the experimental defects in select products so as to increase the data sets associated with fail products having defects. In some embodiments, the product can be a sample cartridge configured for analyzing a biological sample. The failure classification can pertain to a feature of a lid of the sample cartridge, where the feature includes any of: a chimney, a weld between the lid and a cartridge body, a film seal on the lid, or any combination thereof. In some embodiments, the model is configured for use within an automated defect detection of the sample cartridge during manufacture.

In yet another aspect, the invention pertains to a defect detection module operably and communicatively coupled to an automation control system of a product manufacturing line, the defect detection module including: a communication unit that is communicatively coupled to a control unit and/or one or more sensors so as to receive one or more data sets regarding the product and/or a manufacturing process; and a processing unit having a memory with programmable instructions recorded thereon, where the instructions include a model thereon configured for determining pass or fail of the product based on the one or more data sets, where the model is developed by a combination of supervised transfer learning through auxiliary tasks and a combination of supervised and unsupervised learning. In some embodiments, the module is developed utilizing any of the training methods described herein.

In one aspect, the invention pertains to method of training a model for automated defect detection of a product in a manufacturing line. In some embodiments, the method is fully automated after training of a model by machine learning. The method can include steps of: obtaining one or more images of the product from one or more angles; performing image labelling to obtain expert labels of one or more defects of the product; and performing training and validation of a model utilizing machine/deep learning using the image labels. In some embodiment, performing image labelling includes receiving input from visual inspection of the images by one or more human experts. The images are presented to one or more human experts for image labelling via a web-based interface such that the human expert is located remotely from the manufacturing line. In some embodiments, the training includes building a binary classification and a multi-class classification. In some embodiments, the binary classification is pass/fall and multi-class classification is a type of defect. In some embodiments, training can further include determining metrics for false negative and/or false positives. In some embodiments, training further includes utilizing consensus voting where multiple labels of a given product differ. In some embodiments, the method further includes performing a digital review to resolve conflicts in the expert labels. Preferably, the images are obtained automatically by robotics within the manufacturing line. In some embodiments, the method includes controlling a robotic inspection system to automatically obtain the one or more images and automatically detect defects in real-time and robotically remove any defective cartridges from the manufacturing line.

In another aspect, the invention pertains to an automated defect detection method of a product in a manufacturing line. The method can includes steps of: obtaining one or more images of the product from one or more angles by a robotic setup; analyzing the images with a model configured for defect detection, where the model is trained using labels from one or more human experts based on visual inspection of prior images; determining one or more defective cartridges in one or more cartridges in the production line via the model; and removing the one or more defective cartridge from the manufacturing line via robotics. In some embodiments, the model accesses binary classifications and multi-class classification of the cartridges. In some embodiments, the images are obtained automatically by robotics within the manufacturing line. The method can further include steps of: robotically positioning the product at differing angles to obtain a plurality of images at differing angles; determining product defects from the plurality of images in real-time; and robotically removing any defective cartridges from the manufacturing line. In some embodiments, the product is an assay cartridge with attached reaction vessel (e.g. "GX tube"), and the one or more defects pertain to the reaction vessel.

In yet another aspect, the invention pertains to an automated inspection system setup for defect inspection of a product in a manufacturing line. The inspection system can include: a robotics systems configured for handling a product in a manufacturing line; a vision system configured for obtaining one or more images of the product; and a robotics controller communicatively coupled with the robotic system. The robotic controller and the vision system can include a processor communicatively coupled with a memory having instructions recorded thereon, the instructions configured with a defect detection model, wherein the model is trained using labels from one or more human experts based on visual inspection of prior images. In some embodiments, the robotics include a universal robotic arm that includes a gripper hand and that is configured to pick up and position the product at one or more angles for the one or more images obtained by the vision system. In some embodiments, the vision system includes: a light, an optics lens, and an image capture device. In some embodiments, the setup can include a teach module configured to display the one or more prior images to one or more human experts and receive one or more inputs of the expert labels for use in training the model by machine/deep learning. In some embodiments, the product is an assay cartridge with attached reaction vessel, and the one or more defects pertain to the reaction vessel.

BRIEF DESCRIPTION OF THE DRAWINGS

FIG. 3B illustrates the manufacturing process flow of FIG. 3A with additional external sensors added to obtain image parameters that can be used to develop a model for automated defect detection, in accordance with some embodiments.

DETAILED DESCRIPTION OF THE INVENTION

Figure 1A:
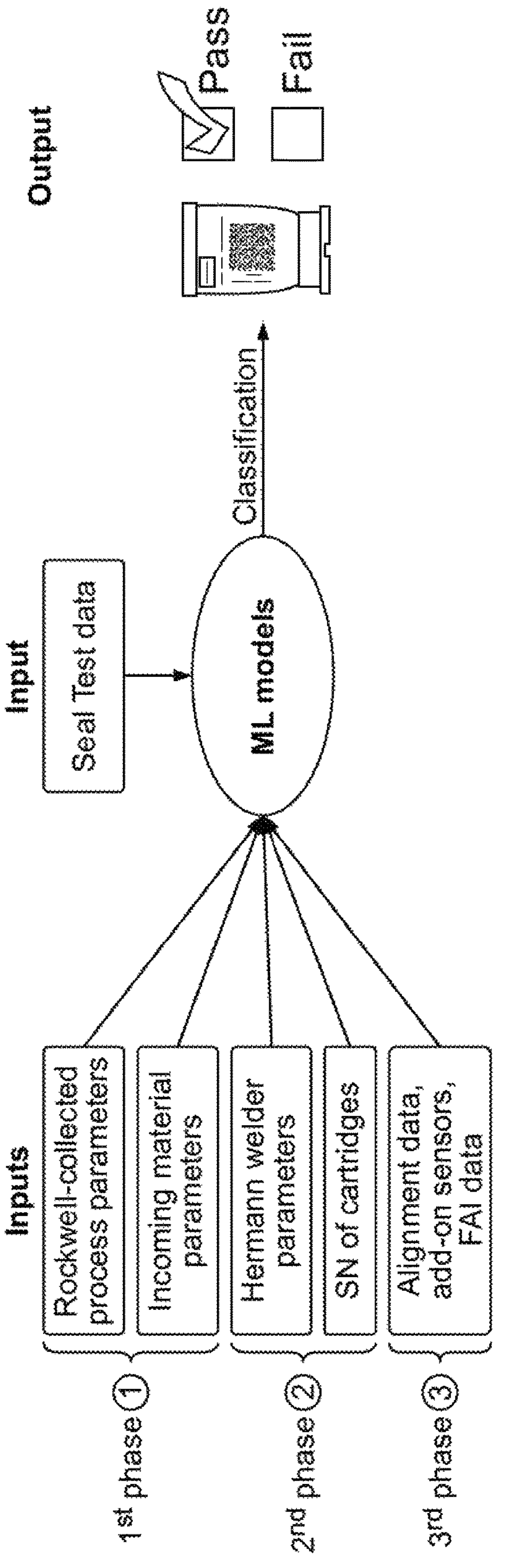
FIG. 1A is a flowchart demonstrating a defect detection approach that utilizes manufacturing parameter inputs fed into a machine learning model to facilitate classification of a manufactured product, the model having been developed by training methods in accordance with embodiments herein.
Figure 1B:
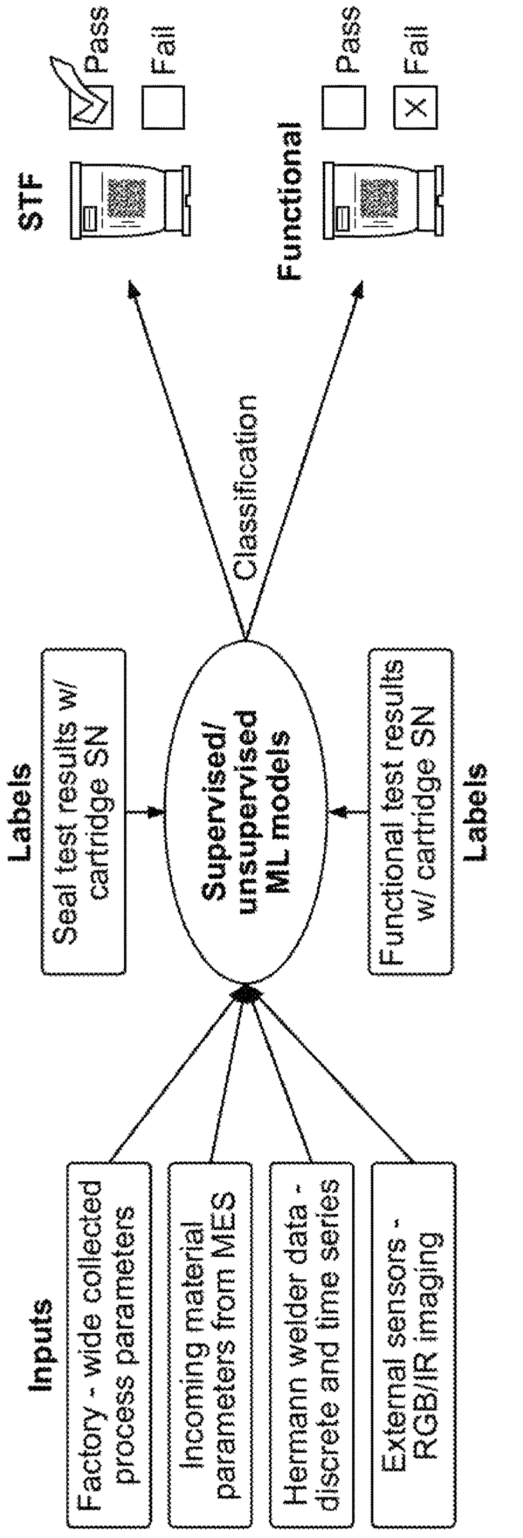
FIG. 1B is a flowchart demonstrating a defect detection approach that utilizes manufacturing parameter inputs fed as labels into a machine learning model, utilizing both supervised and unsupervised learning, the model having been developed by training methods in accordance with embodiments herein.

The present invention relates generally to models for automated defect detection during manufacturing, in particular, defect detection for biological equipment, such as sample cartridges configured for analysis of a fluid sample. Specifically, the invention pertains to training methodologies by which a model can be developed for defect detection. Flowcharts of such defect detection methods using these models are shown in FIG. 1A-1B discussed in further detail below. FIGS. 2A-4 depict an exemplary product and associated manufacturing process, sources of defects and data that can be used by such models. The method for developing these models is detailed in FIGS. 5-7. It is understood that while these methods are particularly applicable to developing models for defect detection of manufactured products, these concepts can be applied to development of any model using limited data sets that do not lend themselves to use of conventional deep learning techniques.

I. Cartridge Manufacturing Overview

In one aspect, the invention pertains to developing models for use in automated defect detection of a manufacturing a product, such as a sample cartridge. To illustrate one practical application of this invention, these concepts are described with respect to an exemplary sample cartridge, as shown in FIG. 2A. The sample cartridge includes a lid apparatus 100 sealed atop the cartridge body 200 that holds the reagents and fluid sample. The lid apparatus 100 includes a bottom lid portion that is sealed to the cartridge body and a top lid portion that flips open, as shown, to allow the user to deposit a fluid sample in the cartridge. The sample cartridge is provided to the user having reagents already disposed within selected chambers and sealed within the cartridge by a thin film 110 sealed atop the bottom lid. The thin film includes a central opening for a syringe instrument of a receiving module and an opening for insertion of the fluid sample.

Figure 2B:
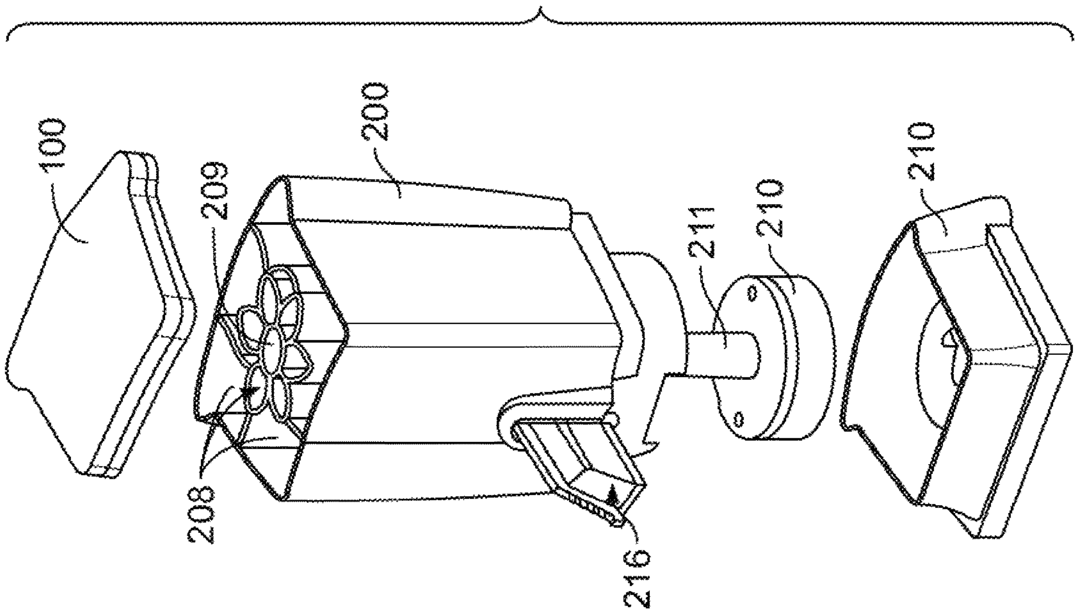
FIG. 2B illustrates an exploded view of the sample cartridge illustrating its major components, including the lid apparatus, multi-chamber body, reaction vessel, valve assembly and base, in accordance with some embodiments.
Figure 2A:
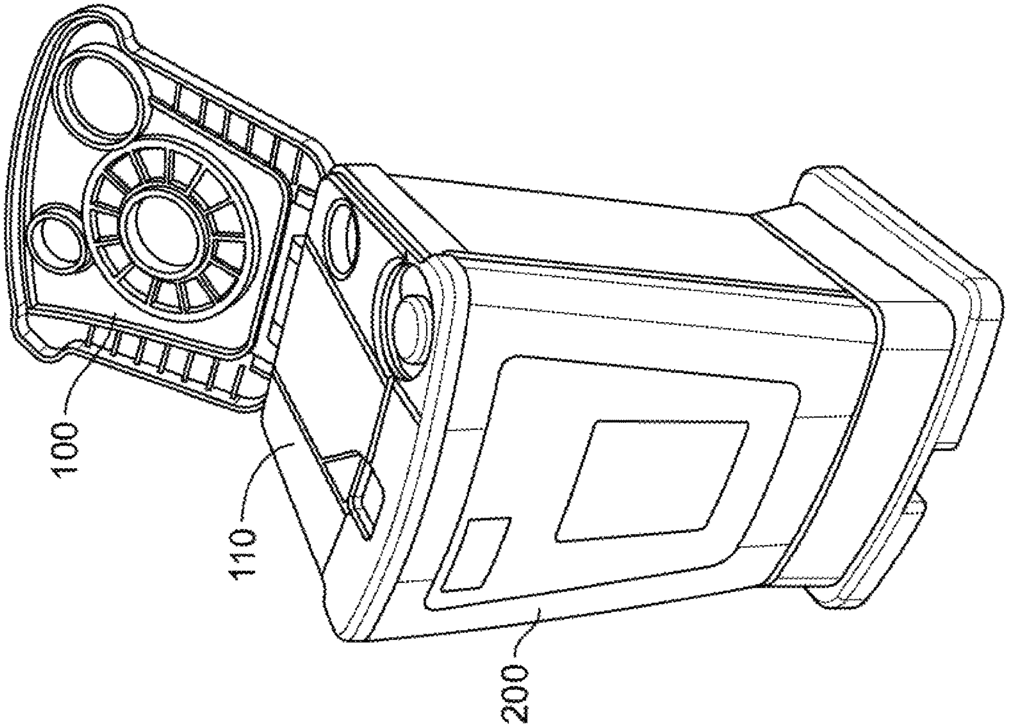
FIG. 2A illustrates an exemplary sample cartridge having a welded lid apparatus and film seal, as provided to the user, with the lid in the top lid open for receiving a fluid sample.

FIG. 2B depicts an exemplary cartridge suitable for performing a multi-target panel assay, as described herein. The illustrated cartridges are based on the GENEXPERT® cartridge (Cepheid, Inc., Sunnyvale, Calif.). The cartridge 100 comprises a cartridge body 200 having multiple chambers 208 defined therein for holding various reagent and/or buffers. The chambers are disposed around a central syringe barrel 209 that is in fluid communication with valve body 210 through valve syringe tube 211 extending through the syringe barrel 209. The valve body 210 is interfaced within the cartridge body and supported on a cartridge base 210. The cartridge typically contains one or channels or cavities that can contain a filter material (e.g. glass filter column) that can function to bind and elute a nucleic acid. In various embodiments, the cartridge further comprises one or more temperature controlled channels or chambers that can, in certain embodiments, function as thermocycling chambers. A "plunger" not shown can be operated to draw fluid into the syringe barrel 209 and rotation of the valve body/syringe tube provides selective fluid communication between the various reagent chambers and channels, reaction chamber(s). Thus, the various reagent chambers, reaction chambers, matrix material(s), and channels are selectively in fluid communication by rotation of the valve and plunger and reagent movement (e.g., chamber loading or unloading) is operated by the "syringe" action of the plunger. The attached reaction vessel 216 ("PCR tube") provides optical windows to provide real-time detection of, e.g., amplification products, base identity in sequencing operations, by operation of the module within the system described herein. It is appreciated that such a reaction vessel could include various differing chambers, conduits, or micro-well arrays for use in detecting the target analyte. The sample cartridge can be provided with means to perform preparation of the biological fluid sample before transport into the reaction vessel. Any chemical reagent required for viral or cell lysis, or means for binding or detecting an analyte of interest (e.g. reagent beads) can be contained within one or more chambers of the sample cartridge, and as such can be used for sample preparation.

An exemplary use of such a sample cartridge with a reaction vessel for analyzing a biological fluid sample is described in commonly assigned U.S. Pat. No. 6,818,185, entitled "Cartridge for Conducting a Chemical Reaction," filed May 30, 2000, the entire contents of which are incorporated herein by reference for all purposes. Examples of the sample cartridge and associated instrument module are shown and described in U.S. Pat. No. 6,374,684, entitled "Fluid Control and Processing System" filed Aug. 25, 2000, and U.S. Pat. No. 8,048,386, entitled "Fluid Processing and Control," filed Feb. 25, 2002, the entire contents of which are incorporated herein by reference in their entirety for all purposes. Various aspects of the sample cartridge can be further understood by referring to U.S. Pat. No. 6,374,684, which described certain aspects of a sample cartridge in greater detail. Such sample cartridges can include a fluid control mechanism, such as a rotary fluid control valve, that is connected to the chambers of the sample cartridge. Rotation of the rotary fluid control valve permits fluidic communication between chambers and the valve so as to control flow of a biological fluid sample deposited in the cartridge into different chambers in which various reagents can be provided according to a particular protocol as needed to prepare the biological fluid sample for analysis. To operate the rotary valve, the cartridge processing module comprises a motor such as a stepper motor typically coupled to a drive train that engages with a feature of the valve to control movement of the valve in coordination with movement of the syringe, thereby resulting in movement of the fluid sample according to the desired sample preparation protocol. The fluid metering and distribution function of the rotary valve according to a particular sample preparation protocol is demonstrated in U.S. Pat. No. 6,374,684.

Figure 2C:
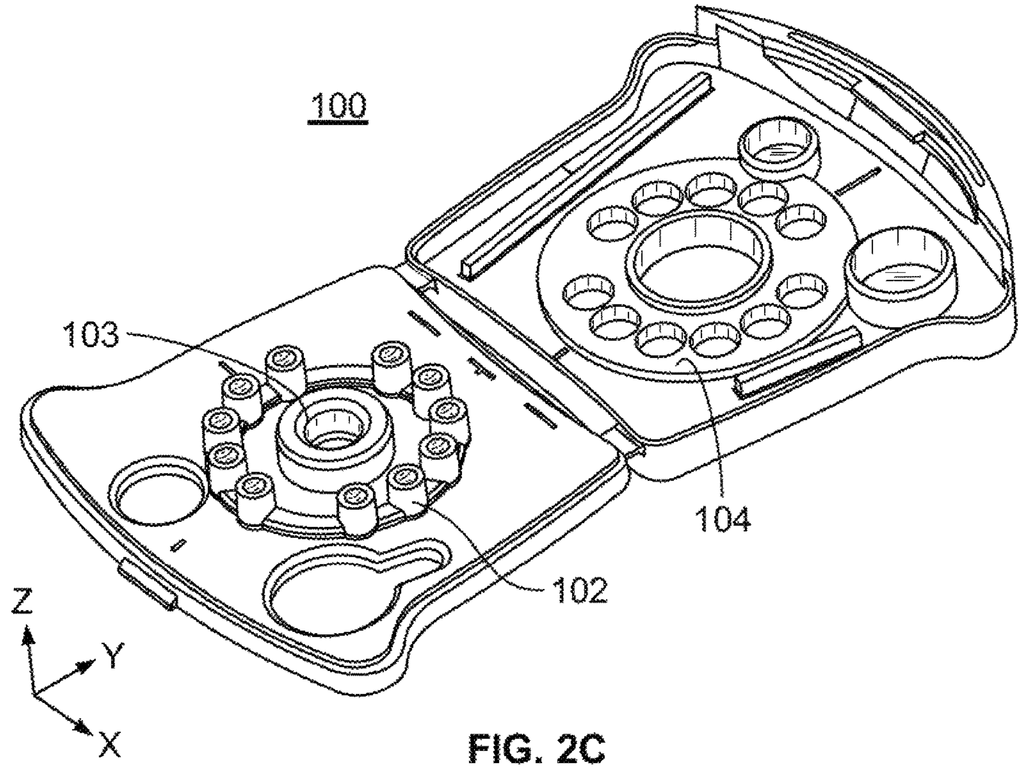
FIGS. 2C-2D show a detail view of the lid apparatus.
Figure 2D:
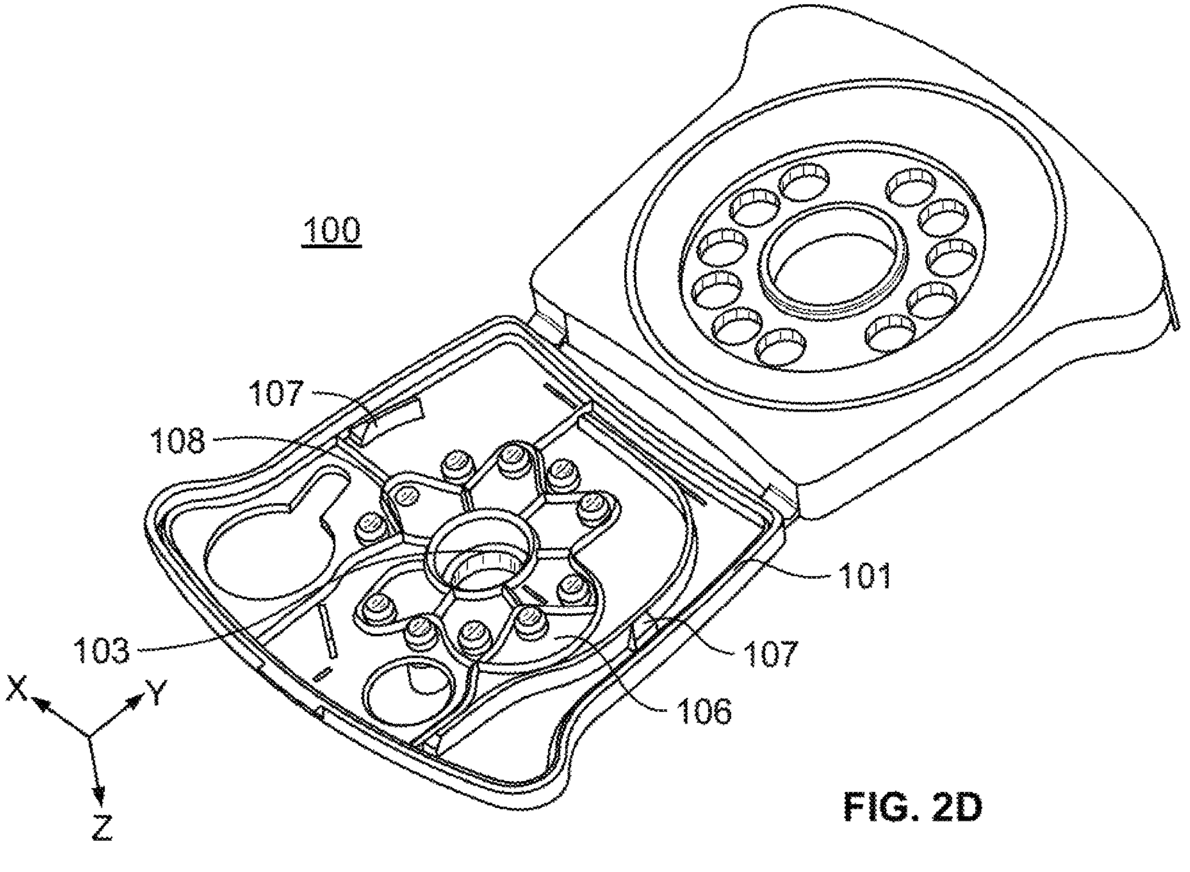

FIGS. 2C-2D shows a detailed view of the exemplary lid apparatus 100, which includes a central opening for passage of the syringe/plunger, which effects movement of fluids between the chambers, and the central opening is surrounding by a plurality of chimneys 102 (with passages) that protrude into openings 104 in the top lid. Accordingly, the lid apparatus 100 includes a substantially uniform bottom-surface 106, and thus the shown inner welding pattern is not coextensive with any walls that extend from the bottom-surface 106. The chambers of the fluid container apparatus disclosed herein can contain one or more reagents for a variety of purposes. These reagents may be present in a variety of forms. Non-limiting exemplary reagent forms can include a solution, a dry powder, or a lyophilized bead. The reagents may be intended for different purposes including but not limited to chemical and/or enzymatic reactions, sample preparation, and/or detection. Non-limiting exemplary purposes can include lysis of cells or microorganisms, purification or isolation of an analyte of interest (e.g., a specific cell population, a nucleic acid or a protein), digestion or modification of nucleic acids or proteins, amplification of nucleic acids, and/or detection of an analyte of interest. Additional details of the lid apparatus can be found in U.S. Pat. No. 10,273,062, the entire contents of which are incorporated herein by reference for all purposes.

FIG. 2C shows a top view of the lower-side of bottom-lid and underside of the top-lid portion. The lower-side of bottom-lid includes a plurality of chimneys 102 that protrude upwards from the top surface of the bottom-lid portion and are received in corresponding holes 104 in the top-lid portion. The plurality of chimneys 102 and openings 104 surround a central opening 103 through which a syringe instrument of the module extends during operation of the sample cartridge therein to facilitate fluid flow between the chambers by movement of the valve body. FIG. 2D shows a bottom view of the lower-side of bottom-lid of lid apparatus 100, which includes a lower-side main surface, and a top-side of the top-lid portion. The underside of the bottom-lid portion is welded onto the top edge of the cartridge body. To facilitate welding, a raised welding ridge 101 is continuous about the periphery of the bottom-lid, between the edge alignment features 107 and the outermost wall. When seated in a proper fashion, the edge alignment features 107 and outermost walls prevent excessive rotation of the bottom-lid against the fluid container 200, thus aligning the raised welding ridge 101 of the bottom-lid with weldable features (e.g., top edges of walls) of the cartridge body. A plurality of walls 108 extend from a central portion of the lower-side main surface. The walls are patterned in a flower petal-like arrangement, about the central opening 103. Here, the walls are formed as six petals. A raised welding pattern is present on the top edges of the walls. The raised welding pattern connects to the welding ridge 101. In this manner, fluidic zones are created outside the petals. When a fluid container and the bottom-lid are welded via the raised welding pattern and welding ridge, sub-containers within the bottom container are fluidly isolated from one another (at least at the interface between the fluid container and the bottom-cap).

Figure 2E:
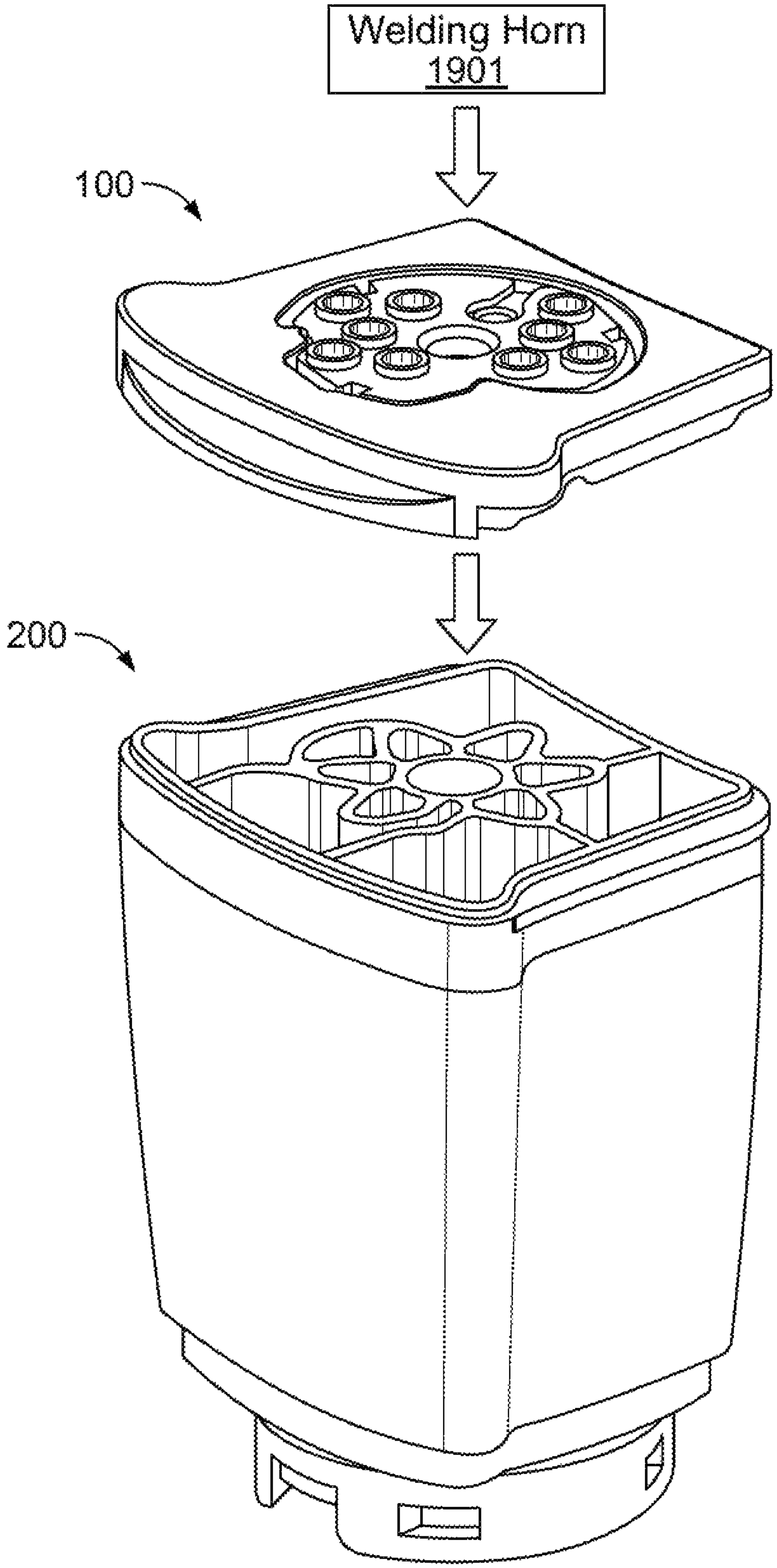
FIG. 2E shows the lid apparatus before placement atop the sample cartridge body for ultrasonic welding by the welding horn.

FIG. 2E shows the lid apparatus 100 in relation to the cartridge body 200. The cartridge body 200 contains a plurality of chambers that can be fluidly coupled or non-coupled according to the position of an internal valve assembly. The chambers are defined by walls that extend to the top of the cartridge body 200. The fused interface between the lid apparatus 100 and the cartridge body 200 is created such that the chambers are sealed off from one another by way of a welded interface between the raised welding pattern 160 and welding ridge 156 and the chambers of the container 200. The lid apparatus 100 is welded to the fluid container by way of an ultrasonic welding horn 1901 that interfaces with the plateau 120 while the apparatus is seated on the container 200. The welding horn 1901 generally comprises a metal cylinder shaped to interface against and around the plateau. The welding horn is part of a greater welding apparatus (not shown) which provides energy to the horn. A commercially available ultrasonic welding apparatus is available from manufactures such as Hermann Ultrasonics, Bartlett, Ill. 60103 or Branson Ultrasonics, a division of Emerson Industrial Automation, Eden Prairie, Minn. 55344, can be used in this process. Typically, the welding operation described above is performed at a welding station along the manufacturing/production line of the sample cartridge.

Figure 2F:
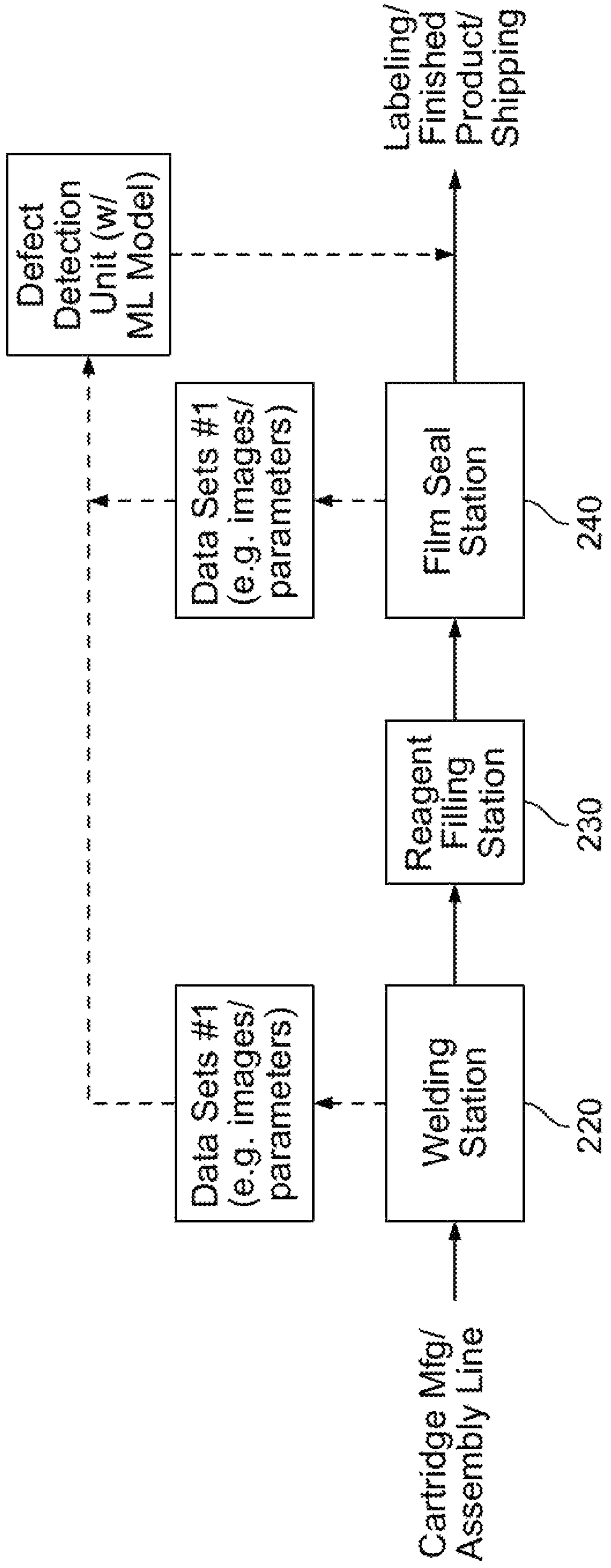
FIG. 2F shows a schematic of a portion of the manufacturing line process which provides data sets to the defect detection unit that utilizes a model, in accordance with some embodiments.

FIG. 2F shows a schematic of a portion of the manufacturing line that includes the welding station 220, reagent filling station 230, and the film seal station 240. At the welding station, automated equipment places the lid apparatus 100 atop the cartridge body 200 and an ultrasonic horn is pressed down and ultrasonic energy is applied for at least 3-5 seconds so as to weld the lid to the cartridge body by ultrasonic welding. As described above, the welding ridges on the underside of the bottom lid are shaped and designed to be sealingly welded to the top edges of the cartridge body chambers. After welding, the cartridge is moved in an automated sequence to the reagent filling station where one or more reagents (e.g. beads/fluids/powder) or processing materials are deposited in select chambers through the chimney openings in the lid. After the reagents or other compounds are placed in the chambers, a thin film is seal is applied to the top surface of the bottom lid so as to seal the chimney passage openings, thereby sealing the reagents and process materials inside the cartridge. Automated equipment places the thin film atop the bottom lid (the lid being in the open configuration) and applies heat so as to seal the thin film onto the lid. The thin film includes a central aperture (e.g. cross-cut slit) to allow passage of the syringe instrument through the film, and another opening on the lower right to allow injection of the fluid sample by the user into a sample chamber, however, the remaining openings in the lid that include the chimney openings to the reagent chambers are sealed by the thin film seal. As described further below, one or more data sets can be obtained from each of these manufacturing process, which can be input into an automated defect detection unit using a model to determine acceptability of each cartridge. The model was developed using the same data received from many cartridges using deep learning techniques described herein.

II. Example Defect Detection Methods

A. Overview

In one aspect, the defect detection methods utilized herein utilize a model developed through machine learning that is based on data associated with the manufactured produce and/or associated manufacturing processes. In some embodiments, the data includes information from one or more external sensors disposed at one or more locations along the manufacturing production line of the product (e.g. image data, sound data) or operational parameters received from sensors or control units. The external sensors can include, but are not limted to, any of IR cameras, RGB cameras, high-resolution cameras, ultrasonic microphone or any combination thereof. In some embodiments, the IR and RGB cameras are configured to obtain a thermal distribution of the lid during the ultrasonic welding or of the film during or after heat sealing of the film. In other embodiments, the data includes parameters of manufacturing equipment during a process, for example, power, travel, force amplitude and frequency of a welder. While conventional machine learning is well suited for analyzing well-defined features/attributes of large data sets, it is ill suited and inefficient for limited data sets, such as those associated with product defects. For this reason, conventional approaches still rely heavily on destructive testing and human inspection.

Given the breadth and complexity of the data, it is advantageous to utilize a machine learning (ML) model to determine a relationship between one or more characteristics or parameters of the data sets from the external sensors and a cartridge defect. By utilizing a ML model, subtle variations in temperature distribution, image matching or an audio trace can be associated with defects that could otherwise not be detected by visual inspection or standard testing approaches. However, given the limited amount of data associated with defects (which are relatively infrequent), conventional machine learning techniques are not well suited for developing models for defect detection. Thus, the training models described herein can be used to develop such models to allow for automated defect detection in real-time during manufacturing.

B. Example Defect Detection Methods

In one aspect, the automated process uses ML models that associates one or more parameters or characteristics of a manufacturing process and/or product component with a particular defect. Training methods by which such models can be developed are discussed further below in reference to FIGS. 5-7. In some embodiments, the defects are associated with product features of assay cartridges, such as welded seals (e.g. overweld, underweld, cracked chimney) and/or film seals (e.g. incomplete seal, melted chimney). The parameters or characteristics can include any attribute associated with the manufacturing process or a product component.

1. Implementation Example 1

As shown in FIG. 1A, the automated method can include obtaining one or more inputs of any number of parameters associated with manufacturing methods and processes. In this embodiment, the parameters can be associated with a first phase of manufacturing (e.g. automation control-collected process parameters, such as Rockwell database parameters; incoming material parameters), a second phase (e.g. welding parameters, cartridge parameters, such as lot number or serial numbers), or a third phase (e.g. alignment data, sensor data, FAI data). These one or more inputs are fed into the ML model that analyzes the various input in combination with actual testing data (e.g. seal testing data) to determine an association between the one or more parameters/characteristics and a respective defect. The ML model is used to determine an algorithm by which the sample cartridge can be classified (e.g. pass, fail due to defect) based solely, or partly, on the one or more parameters/characteristics derived from the data sets from the one or more external sensors. It is appreciated that the algorithm may utilize one or more inputs, parameters in various combinations, as well as weighting of one or more parameters, or a relationship between parameters. Preferably, the algorithm is applied in real-time during manufacturing so that cartridges determined to have defects can be removed from the production line. The automated detection methods described herein can complement or replace standard testing and inspection by personnel.

As shown in FIG. 1B, the automated method can include obtaining one or more inputs of any number of parameters associated with manufacturing methods and processes. In this embodiment, the parameters can include, but are not limited to, any of: factory parameters (e.g. process parameters), incoming material parameters, specific process data (e.g. welder data), sensor data (e.g. RGB, IR imaging, optical imaging). These one or more inputs are fed into a ML model that analyzes the various input in combination with actual testing data (e.g. seal testing data) to determine an association between one or more parameters and a defect. In this embodiment, the ML model can include supervised and/or unsupervised learning as described herein, and can utilize seal test results, visual inspection results and functional test results as labels to determine an algorithm by which the sample cartridge can be classified (e.g. pass/fail seal test failure, pass/fail functional, pass/fail visual inspection). It is appreciated that the algorithm may be designed to associate the requirements of a given testing standard, for example the seal test failure (STF) test or a functional test. In some embodiments, there can be multiple criteria applied for defect detection, for example, some embodiments utilize three criteria: (i) PASS/FAIL from seal test failure (based on weight measurements before/after seal test after reagents reagents-on-board automated line (ROBAL)), only applied to a selected subset of production data; (ii) PASS/FAIL from function test (based on cartridge test with negative/positive sample), only applied to a selected subset of production data; and (iii) PASS/FAIL from visual inspection (e.g. cracked/ broken chimneys, delays from human visual inspection), only applied if too many failures from other defect criteria in production data. It is appreciated that some embodiments may utilize variations of these criteria or differing criteria.

Figure 3A:
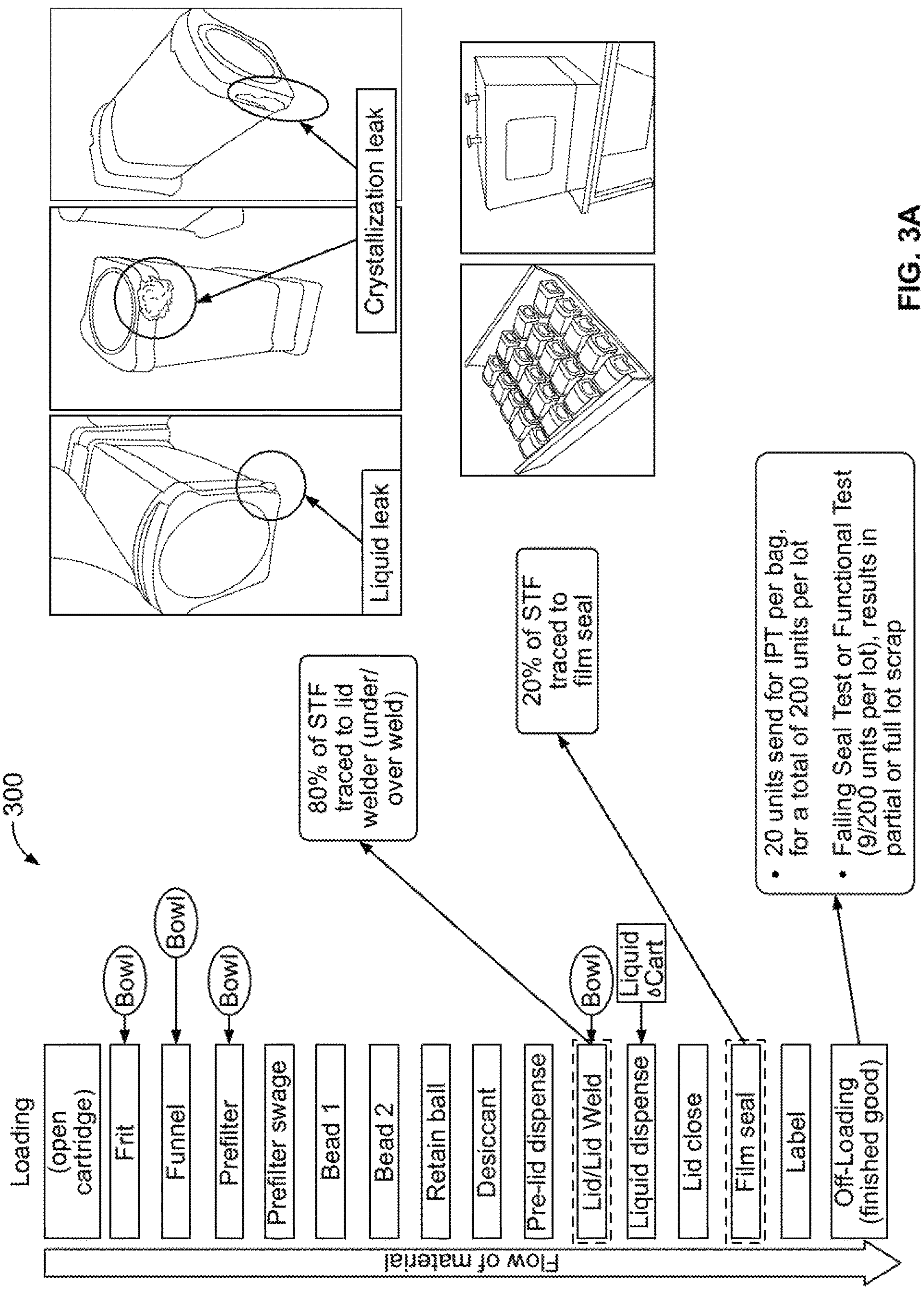
FIG. 3A illustrates a manufacturing process flow chart and identifies various sources of seal test failures in an exemplary manufacturing method of sample cartridges.

FIG. 3A shows various sources of seal test failures. An exemplary manufacturing process flow schematic 300 is shown at left. The process flow includes the lid welding and film seal steps that are often associated with defects that cause seal test failures. For example, 80% of seal test failures can be traced to the lid welding step (e.g. either under or over welding), and about 20% of seal test failures can be traced to the film seal step. Currently, defects caused by these steps are not detected until after the sample cartridges are labelled and off-loaded as a finished product, either by visual inspection by personnel or in a STF or functional test, which can result in a partial or full lot scrap. Accordingly, the automated detection systems and methods described herein can avoid this waste by allowing for detection of defects in real-time before the product manufacturing is completed by utilizing one or more external sensors positioned along the existing manufacturing process flow line. Thus, this approach described herein allows for improved defect detection, with minimal or no adjustment to the existing manufacturing line. Other example of defects in the sample cartridge that could potentially be detected by use of a ML model can include, but are not limited to, any of: broken/cracked chimneys, film seal failures, lid weld failures, base leaks, body leaks, overmold crack, reaction vessel defect (e.g. dents, film anomalies), valve body cracks, cartridge body damage (e.g. dents, nicks, crack), beads (fill/quantity), or missing parts (e.g. plunger, valve body, beads).

Figure 3B:
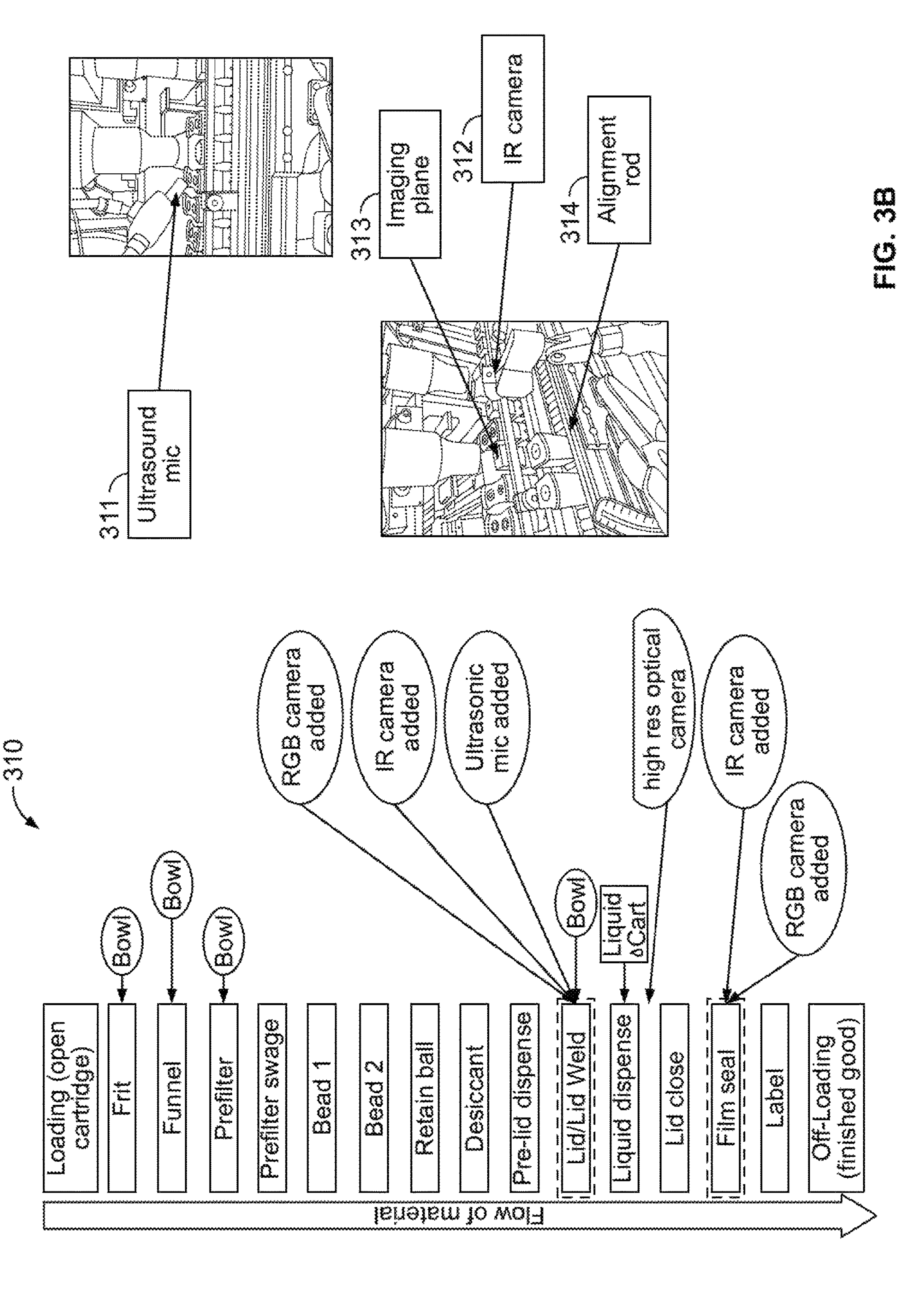
FIG. 3B illustrates the manufacturing process flow of FIG. 3A with additional external sensors added to obtain parameters that can be used to develop a model for automated defect detection, in accordance with some embodiments.

FIG. 3B shows the manufacturing process flow line schematic 310 with various external sensors added to an existing manufacturing line setup. In some embodiments, the lid welding step/station can include a RGB camera, an IR camera, or both. The IR camera provides thermal imaging during welding to assess weld integrity. The RGB camera provides imaging during welding to assess component integrity (e.g., chimney breaks, film seal, etc.). In some embodiments, an ultrasound microphone 311 can also be added to assess the weld based on sounds during welding. In some embodiments, an IR camera 312 is used to image along an imaging plane 313 and an alignment rod 314 can be used to ensure the cartridge is appropriately aligned in the imaging plane for imaging with the camera. The film seal step/station can also include an infrared camera that provides thermal imaging during welding to assess integrity of the thin film seal. A high-resolution optical RGB camera can also be used to inspect the thin film alignment. The RGB and infrared cameras can be directed from any angle (e.g. an overhead view, angled view, a side view or any combination thereof). It is appreciated that any of these external sensors could be used individually or in combination with any other sensors at various other locations in the process flow line. It is understood that in order to implement this approach within the existing manufacturing process flow line, the external sensors can be synced or matched with operation of the existing process equipment for a given sample cartridge. This can be performed using existing cartridge tracking (e.g. by S/N) or various other approaches (e.g. RFID).

Figure 4A:
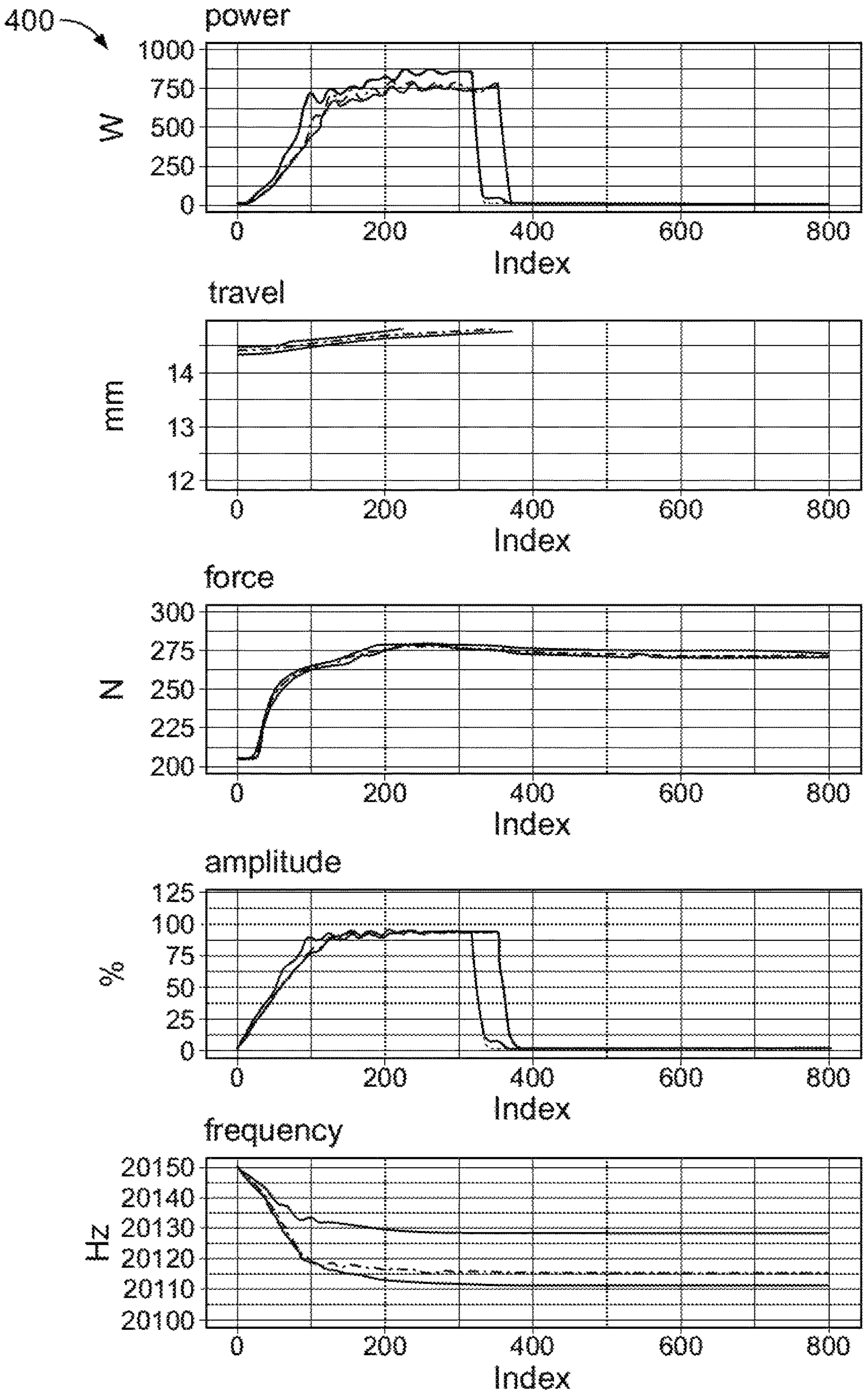
FIGS. 4A-4B illustrates various operational parameters associated with manufacturing processes parameters that can be used to develop a model for automated defect detection, in accordance with some embodiments.
Figure 4B:
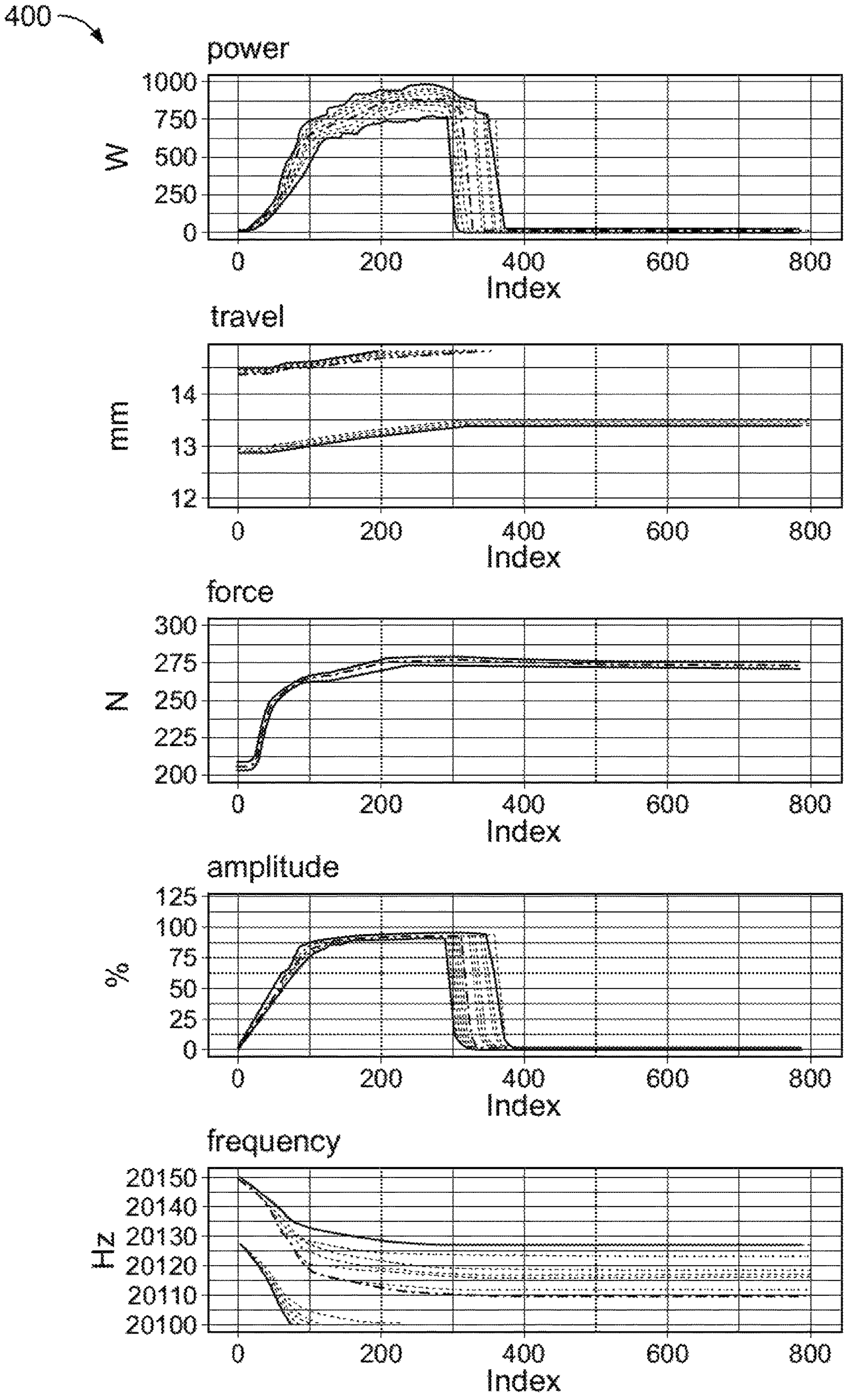
Figure 5:
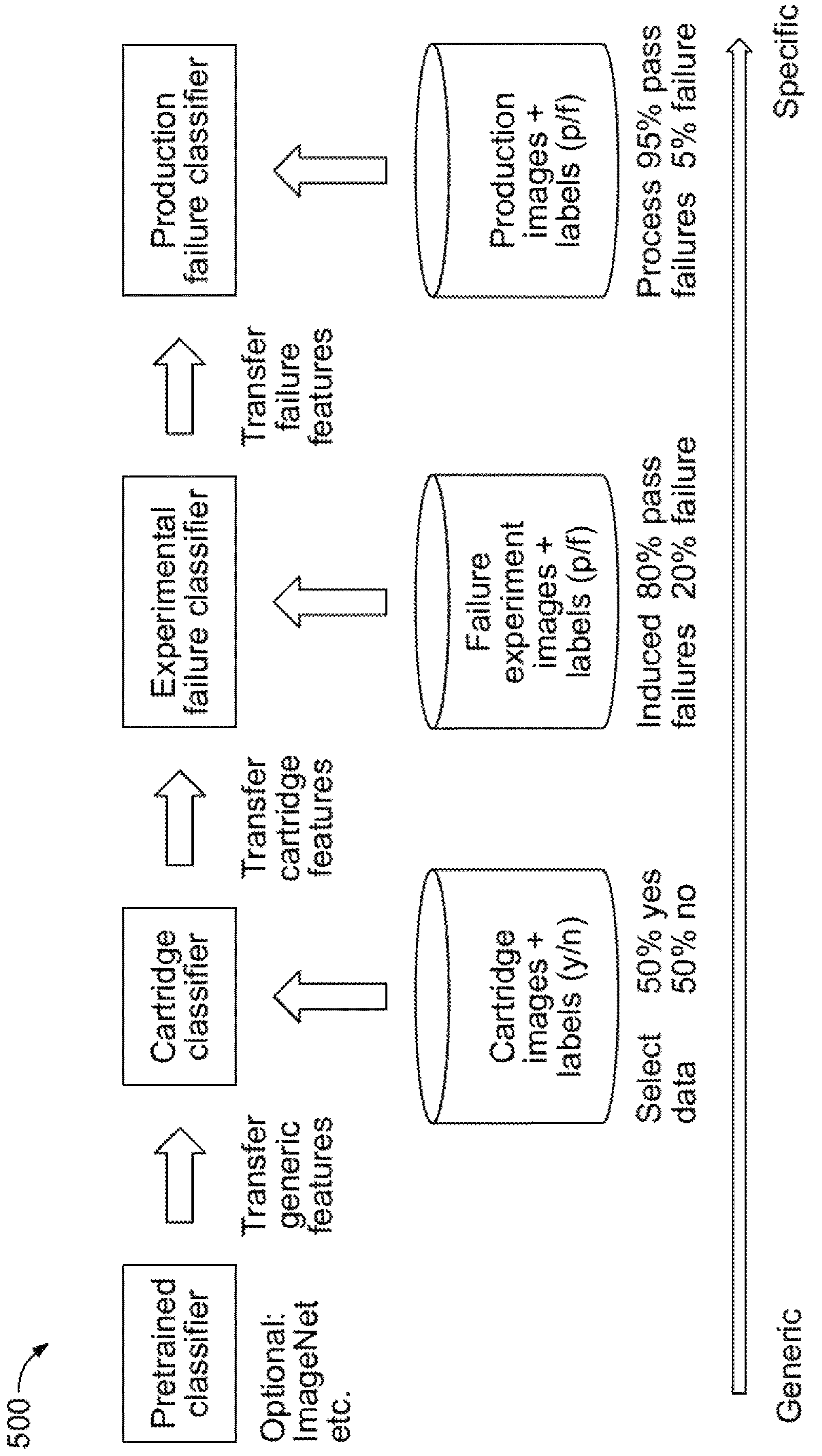
FIG. 5 shows a schematic of a training methodology to develop a high-accuracy model for automated defect detection that utilizes supervised transfer learning through auxiliary tasks, in accordance with some embodiments.

FIGS. 4A-4B show plots 400 of various operational parameters from a manufacturing process of welding the lid to the cartridge body. Similar to the image data noted above, this data can be input into a ML model for purposes of error detection. In some embodiments, any of the data sets (e.g. images, sound, operational parameters) can be input, either individually or in any combination, into a machine learning model for defect detection. FIG. 4A shows the plots of parameters from welding of three failed cartridges and FIG. 4B shows plots of parameters from welding of a large number of acceptable cartridges. Such data can be used to develop the ML model, which can identify a potential cartridge defect based on corresponding data for a given cartridge. These plots demonstrate one challenge in analyzing this data for purposes of defect detection. Due to the large number of samples from FIG. 4B, the data is clearly converging at a standard plot both in shape and range of values. In contrast, the number of samples of defective cartridges is quite limited (e.g. three plots) such that the data has not converged. This imbalanced data set makes development of an association of this data with a defect more difficult with a machine learning model using conventional machine learning techniques, such as supervised learning. This challenge is discussed further below and training solutions to overcome this challenge are detailed in FIGS. 5-7.

Training supervised deep learning models requires a big, labelled data set to determine the various parameters in the different layers of the deep neural network. The optimal dataset for training and validating classifier models contains a comparable size of labelled examples for each class to ensure that every class is adequately learnt. However, in failure detection models, such as those described above, there is a considerable challenge of having to deal with incomplete labels (e.g., many unlabeled data points, only a few labelled data points) since manual failure inspection is often done on a random subset of the entire data only to save costs. The expensive failure labels come from process experts and cannot easily be obtained by labelling services that are offered for simple tasks (e.g. human in picture yes/no). At the same time, in a well-established manufacturing process, failures are much less likely than pass cases. For example, in current manufacturing procedures, cartridges defects are relatively rare, occurring in less than 1% of cartridges, such that data sets on the defects are quite limited. This results in unbalanced datasets with few, under-represented fail cases and thus the difficulty to learn the decision boundary between pass/fail adequately due to high uncertainty in the sparse failure space. Accordingly, conventional supervised deep learning techniques are not well suited for failure data sets for defect detection models.

To overcome the above noted challenges, model development can utilize supervised transfer learning with auxiliary tasks to enable efficient labelling by combining a large set of labelled data that is easier to obtain for a simpler auxiliary task compared to the production failure process. In addition, the methods make use of a large set of unlabeled data for the production failure process using anomaly detection to flag outliers as potential failures and selectively obtain expert labels for the anomalies. This allows efficient expert labelling with more focus on failure labels though they are rare in the production process. The supervised model is then retrained with the anomalies and the corresponding expert labels. When new data becomes available from the production process, an iterative cycle of supervised learning, unsupervised anomaly detection and supervised integration of feedback from labelled anomalies can be applied to improve the supervised model over time. The improved model can then distinguish better between fail/pass cases and triggers less anomalies in the unsupervised mode in the future.

In one aspect, the improved deep learning methodology is based on two linked core ideas: (1) supervised transfer learning through auxiliary tasks; and (2) combination of supervised and unsupervised learning. Each of these is described in detail further below.

Regarding the first aspect, supervised transfer learning through auxiliary tasks uses easy to obtain labels from non-experts for more generic auxiliary tasks, such as detecting a cartridge. A non-expert labeler can be given instructions to create cartridge labels (e.g. yes/no). For example, as shown in the schematic flowchart 500 in FIG. 5. For the generic cartridge detector, it can be easily ensured to have a balanced dataset (e.g. 50% yes, 50% no) by simply dropping samples from the majority class. Optionally, one can even start from a more generic task, such as image classification with ImageNet, with a pre-trained network. The generic cartridge features are then transferred to the more failure-specific experimental failure classifier. For the experimental failure process, a larger number of failures (e.g. 20%) compared to the final production process (e.g. 5%) can be induced explicitly to ensure the availability of sufficient failure labels for the training process. That is, failure or defects can be induced, for example by purposely exceeding proper parameters in the manufacturing process to cause the above noted defects (e.g. cracked chimneys, melted chimneys, overweld). Simple countermeasures such as over-/under sampling, augmentation and weighted loss can compensate for the unbalance in the dataset (80% pass, 20% fail). The final and most specific training task is the production failure classifier that obtains the failure features from the more generic experimental failure classifier. The production failure classifier is trained from the highly imbalanced dataset (e.g., 95% pass, 5% fail) using previously mentioned countermeasures. A trained production failure classifier can then be obtained, which benefits from the knowledge of the more generic auxiliary tasks through the transferred features and is tailored to its specific task by learning from the production images and labels. If it is not feasible to conduct a failure experiment with more induced failures than in a production system, this step can also be skipped, and the cartridge features can directly be transferred to the production classifier.

Figure 6:
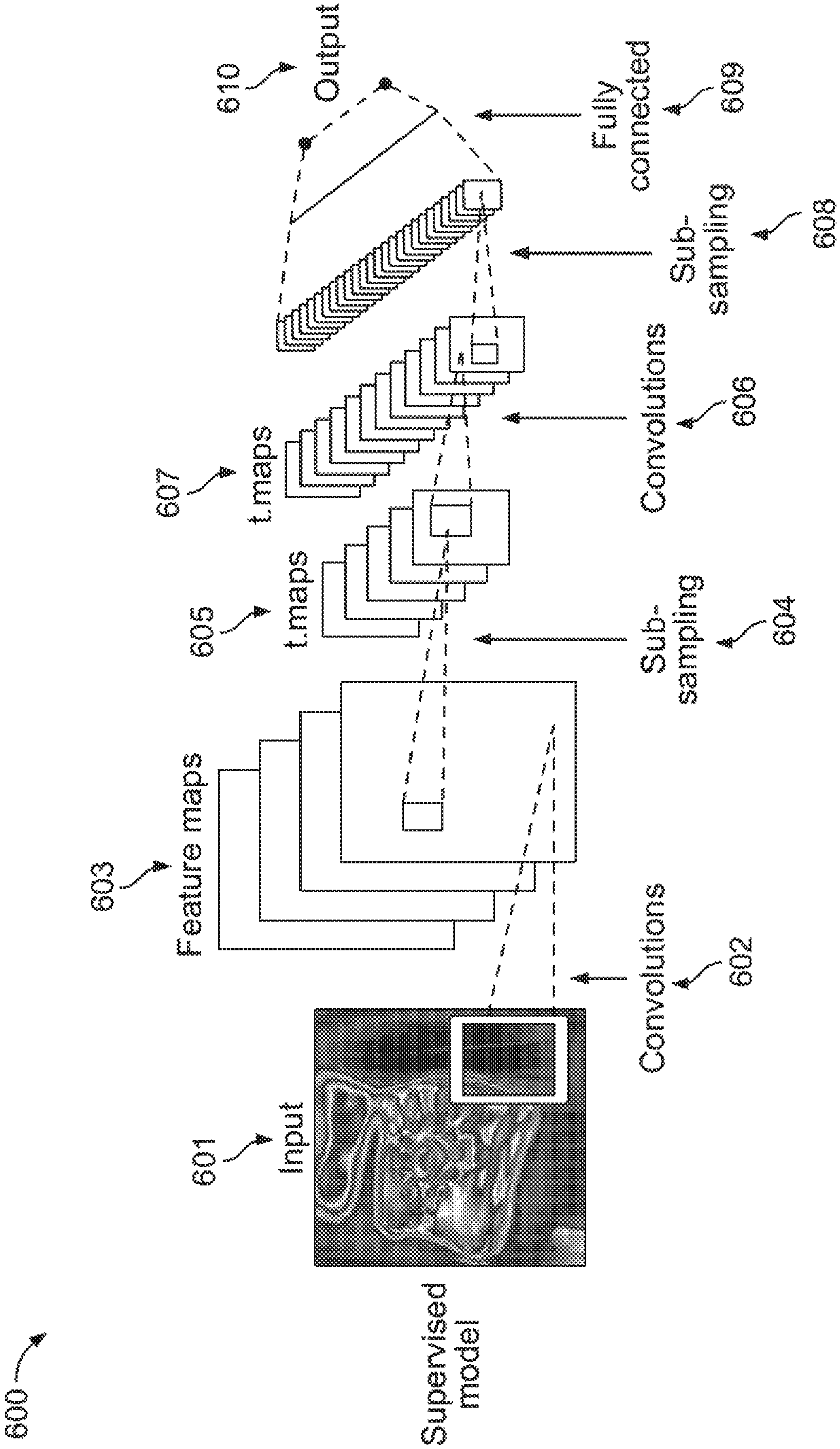
FIG. 6 shows a schematic by which a supervised model utilizes convolutional neural networks in image processing to facilitate development of a high-accuracy model for automated defect detection, in accordance with some embodiments.

FIG. 6 shows a supervised model schematic 600, which can include iterations of convolutions and subsampling of product images. In this embodiment, the model includes receiving an input 601 (e.g. product images, RGB images, IR images, etc.), convolutions 602 are performed to associate portions of the image with product features on feature maps 603 to identify product features being inspected. Subsampling 604 of selected areas (e.g. features/areas of interest) from the feature maps is performed to reduce the amount of data to be transferred and assigned to further detailed feature maps 605. Further convolutions 606 are performed and fed into still further detailed feature maps 607. Further subsampling 608 is performed to produce still further detailed feature map/data sets, which are fully connected to produce a classification output 610 as to the inspection result. Stacking multiple convolution and subsampling layers allows the identification of smaller and larger features at the same time.

Regarding the second aspect, combination of supervised and unsupervised learning in supervised model for multiple auxiliary tasks (see FIG. 6 for supervised model schematic 600 and FIG. 7 for process schematic 700 illustrating combining supervised and unsupervised learning) consists of the following steps:

a) Supervised Transfer Learning from labelled data 710 (see (1) for each auxiliary task)

b) Anomaly detection with supervised model 720 on unlabeled data based on
   - Range limits of feature maps, activations, predictions etc. on supervised (pass) predictions
   - Uncertainty in classification output
   - Any variance/outlier/cluster/etc.

c) Supervised Learning with labeled anomalies 730:
   - an anomaly is detected, flag as an outlier and send for expert inspection.
   - Retrain model with feedback from anomalies and expert labels.

In some embodiments, the next step, process 720 can include determining thresholds for upper/lower range limits (e.g. feature maps, activations, predictions, etc.) or uncertainty in predictions of the supervised model. For manufacturing defect detection implementations, this process can include: on "pass" cases only to differentiate from fail and novel data; and on "pass" and "fail" cases to differentiate form novel data. In some embodiments, the next step, process 730 can include retraining the model with expert labels for detected anomalies based on determined thresholds. In some embodiments, the process 700 is iterative such that step 730 returns to step 710 in order to handle multiple tasks, for example, this process 731 can include moving to a next auxiliary task (e.g. another task on a same level, or to move from generic to specific) or to repeat for the same task when more production data becomes available.

Figure 7:
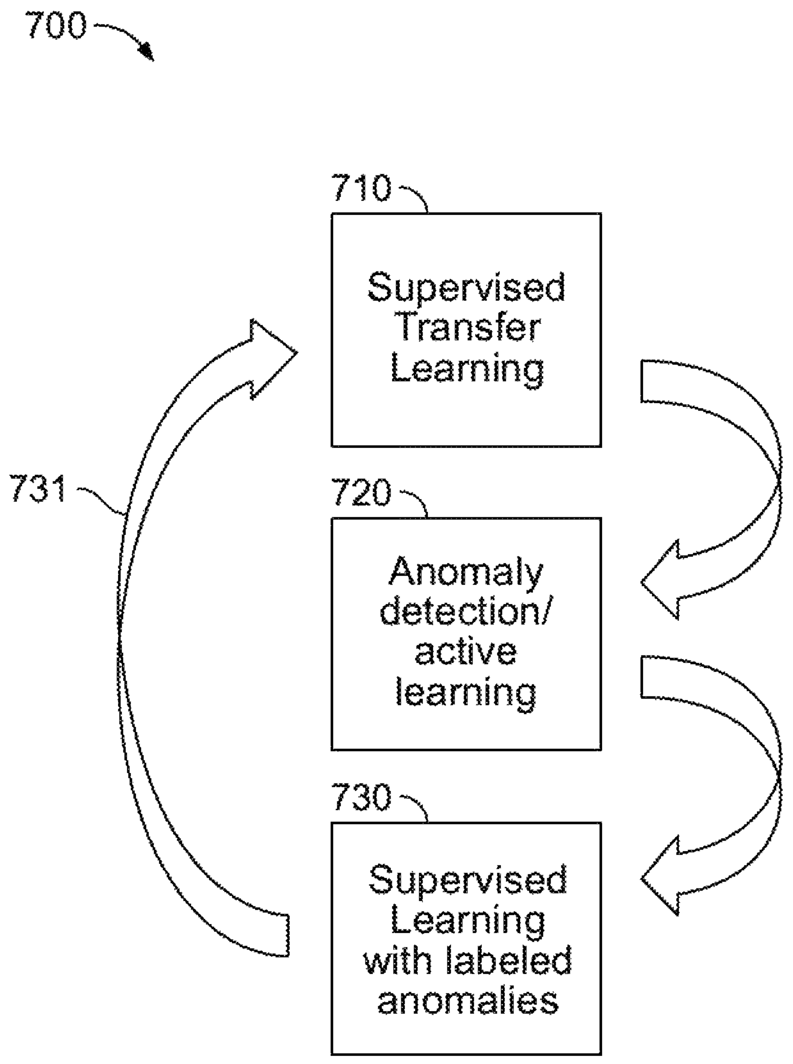
FIG. 7 shows a schematic of a training methodology by which supervised and unsupervised learning for multiple auxiliary tasks can be combined to improve the model for automated defect detection, in accordance with some embodiments.

This process ensures that both labeled and unlabeled data are used to improve the supervised model. Since a higher rate of anomalies for failure cases (e.g. higher rate of range violations/uncertainty etc.) is expected, the approach focuses on labelling more of the rare failure labels. For each auxiliary task (from generic on the left to specific on the right in FIG. 5), the process in FIG. 7 is repeated for iteratively improving the model. Once the production model is reached as the most specific task, there are no further auxiliary tasks left, and the model is further improved based on new production data only.

A method to detect a manufacturing defect of a container associated with an assembly step, the method comprising:

(1) generating a supervised model by inputting a labeled data set into a neural network;

(2) causing the supervised model to:
   - (a) extract a failure feature from the labeled data set, and
   - (b) detect an anomaly in an unlabeled data set based on the failure feature;

(3) generating a retrained model by:
   - (a) labeling the anomaly in the unlabeled data set,
   - (b) adding the anomaly to a labeled anomaly data set, and
   - (c) inputting the labeled anomaly data set into the supervised model;

(4) analyzing data associated with the assembly step via the retrained model to generate a manufacturing status; and (5) transmitting the manufacturing status to an output.

The labeled data set (e.g., a labeled image data set, a labeled container data set, or both) can associated with a generic auxiliary task and the unlabeled data set can be associated with a failure classifier. The labeled data set can include an equal distribution of classifier results.

One, some, or all of the steps can be performed multiples times, such that each new generic auxiliary task is derived from a previous failure classifier.

The supervised model can be retrained by labeling the anomaly in an unlabeled experimental failure data set using the failure feature extracted from the labeled container data set. The unlabeled experimental failure data set can include an unequal distribution of the classifier results. The retrained model can label an anomaly in an unlabeled production failure data set using the failure features extracted from the unlabeled experimental failure data set. The unlabeled production failure data set can include unequal distribution of the classifier results. Generating the retrained model can be re-performed with each collection of production data.

One or more methods can be performed via a non-transitory computer-readable medium having stored thereon instructions that, when executed by a processor, cause the processor to perform the method. The method can be used to detect manufacturing defects of a container, cartridge, or storage vessel in real time. Additionally, the output communicates a status, a result, information, instructions, or combinations thereof to a user or a device. The output can be auditory, visual, haptic, or combinations thereof. The output can be, for example, a screen, a speaker, an interface, or the like.

Supervised transfer learning is commonly used in the data science community. Additionally, process knowledge is used to carefully define auxiliary tasks that are easier to label and for which more balanced labeled data is obtained. Combining unsupervised and supervised learning is typically done by training an unsupervised Autoencoder first and then transferring the features to a supervised model for further supervised training. Also, unsupervised clustering is often applied, followed by transforming the unsupervised problem into a supervised one using the found groups (e.g. cluster labels). In some embodiments, the improved model training methodology starts with Supervised Learning and uses anomaly detection to identify anomalies to improve the supervised model by anomaly expert labels. Active learning is commonly used in supervised models to identify uncertainty in the model predictions. The improved methodology uses uncertainty in the predictions in addition to ranges of activations etc. to further distinguish the normal space from anomalies. Over/under sampling, augmentation and weighted loss functions are possible countermeasures for unbalanced data. This methodology can apply these, but additionally ensure to have more balanced datasets for the more generic auxiliary task(s) in Transfer Learning. In this methodology, all these individual solutions can be combined and tailored to a specific failure detection process and corresponding data sets. Alternatively, one could label more data on the production process itself and apply only Supervised Learning. However, this would costly, since the labels are determined by process experts and failures are rare. If all data/a large subset is labelled, many pass cases have to be labeled to label a sufficient number of fail cases at the same time.

Semi-supervised learning had been expected to be the solution to combine labelled and unlabeled data. However, in reality, semi-supervised learning might only outperform supervised learning for small datasets. According to some researchers, transfer learning from pre-trained models outperforms semi-supervised learning most of the time. Supervised Transfer Learning is a well-established concept in the Machine/Deep Learning community. However, conventional approaches need extensive process knowledge to identify the auxiliary tasks that are relevant for the problem at hand. To identify these auxiliary tasks, Deep Learning experts have to gain process knowledge or work closely together with process experts, which can be cumbersome, time-consuming and costly. The proposed improved training model concepts described herein can be applied to supervised models with multiple input sources (e.g., images, audio, operational parameters, simple and complex machine data such as scalars, vectors and matrices etc.) and multiple output sources (e.g. labels from different inspection procedures). In some embodiments, these concepts can also be extended to time series of multiple or individual input sources. While the training model concepts described herein have been described with respect to defect detection for sample cartridges, it is appreciated that these concepts can be used to develop models for any defect detection for any manufactured product, or even more broadly to develop any model seeking to identify characteristics from limited data sets where conventional machine learning techniques are found lacking.

2. Implementation Example 2

Another example implementation of these inventive concepts in a manufacturing process is in the open cartridge assembly. Currently, at the end of the open cartridge assembly lines (e.g. MiniCAL/Jidoka lines), humans inspect each cartridge in real-time manually, for example with their hands and eyes using a magnifier glass, to identify various defects according to a visual inspection protocol (e.g. D20766) before the passed parts are transferred to the next manufacturing step at ROBAL, and failed parts are transferred to scrap bins. Implementing the concepts described above allows for full automation of the open cartridge inspection process using a cartridge manipulator to move each cartridge into multiple sensors' field of view to capture visual data from multiple perspectives and with different measurement techniques, and to detect defects automatically from the captured data with a Machine/Deep Learning algorithm.

In one aspect, the problem solved by the inventive concepts include the following. Current manual visual inspection process cannot quantify missed defects or over rejects of good cartridges for minor cosmetic defects, since inspections rely only on the decision of a single inspector under time pressure without additional validation of the passed/failed Open Cartridges before they move to the next manufacturing step. On the one side, failed Open Cartridges could be transferred to the ROBAL line, waste further material and personnel resources and—in the worst case—result in a field failure at the customer site. After the ROBAL manufacturing step, only a percentage of cartridges (e.g. a random sampling subset) undergoes seal test failure and/or functional testing, such that potential failures can escape into the field. Although rare, there are occasional reports of failed cartridges in the field which can delay a diagnosis for the patient. Therefore, it is desirable that quality inspection processes along the entire production process chain, both individual and assembled parts, be improved to further improve reliability and patient care. The improvements described herein allow for improved product quality, which improve reliability and customer experience and ensure prompt diagnosis for patients. The manual visual inspection process is exhausting for human personnel since personnel must perform repetitive inspections under challenging conditions (e.g., bright lights, noise, time pressure), which often leads to exhaustion and discomfort up to work-related overuse injuries. This fatigue can lead to human errors that lead to visible errors remaining undetected by current inspection protocols.

The invention herein addresses these problems in several ways. Using transfer learning concepts, an automated Open Cartridge Inspection ("OCI") process has been developed, which uses a cartridge manipulator (e.g. a robot arm with custom gripper tailored to cartridge and/or work cell in production with conveyer belt/indexer to track cartridge). This approach enables a standardized workflow with optimal process conditions (e.g. images from same perspectives/light conditions for all cartridges). The process can use high-resolution sensors (e.g. RGB cameras, 2D laser scanners) to capture small variations on the outer cartridge surface. From the captured sensor data, an image sequence from different cartridge positions, such as the cartridge foot bottom to detect clocking defects or from both sides of the reaction vessel can be analyzed to detect defects (e.g. film wrinkles and dents) that might influence the sensitive PCR reaction result. Utilizing the machine/deep learning algorithm in the analysis, allows more consistent decision making as compared to humans. For training and validating the machine/deep learning algorithms, cartridge inspection (e.g., physical by Process Engineer with their hands) is combined with image labeling (e.g., digital by multiple inspectors by selecting one or multiple defects for each recorded image sequence in a web browser via a web-based interface). In some embodiments, this includes building binary classification algorithms (e.g. configured to predict PASS/FAIL for each cartridge) and multi-class classification models (e.g. configured to predict PASS or one to multiple defects for each cartridge). Metrics can be defined for false negatives (e.g., missed defects) and false positives (e.g., over rejects). Consensus voting (e.g., majority vote, such as in simple cases where 3 out of 4 image labels agree) can be used for more robust labels as ground truth for the algorithm. In some embodiments, a digital review process can be used to resolve conflicts for difficult annotation cases (e.g., where multiple image labelers disagree). In some embodiments, the conflicts can be resolved by a process engineer as a Subject Matter Expert ("SME") and the expert knowledge can also be integrated into the system to use a digital training resource that allows providing virtual trainings to associates before they are involved in real decision making (e.g., new associates/new defects). While there might be more conflicts for early-stage Machine/Deep Learning models, these conflicts will reduce over time once the algorithm matures by retraining using the SME's feedback. The inspectors do not need to make decisions in real-time in the manufacturing line, which are typically challenging conditions and time pressure. Rather, the inspectors can annotate the images for training/validating the algorithms from an arbitrary computer with a standard web browser after the data has been recorded automatically. In some embodiments, there may be a specialized software application for use by the SME on a remote computer or tablet. This capability improves the working conditions for the personnel and allows dynamic resource allocation of inspectors. In some embodiments, for a more objective ground truth, functional test results can be integrated to separate major defects (e.g., defects more likely to result in functional failures) from minor cosmetic defects (e.g. defects less likely resulting in functional failures).

The approach described herein is a marked improvement over other previously proposed solutions to address the same problems for several reasons. First, this approach provides a tailored solution to the manufacturing processes (e.g., robot fingers tailored to the cartridge, camera/cartridge manipulators tailored to specific manufacturing process with constrained space, tailored sensors for specific defects, RGB cameras, 2D laser scanners). Second, this approach allows for setting-up a new automated inspection process by integration of hardware/software for cartridge manipulation. These can include use of any of: Vision System, robotic arm, Machine/Deep Learning models and data infrastructure, image annotation, robust labeling using consensus voting (e.g. take only labels where 3 out of 4 labelers agree as easy inspections), digital review/training of image annotators (e.g., to resolve more difficult inspections and more consistent decision-making over time), or any combination thereof. Third, conventional systems often use classical computer vision which depends on specific defects, which requires more domain knowledge to extract defect features by a human SME, and does not generalize as well as Machine/Deep Learning, which learn defect features automatically.

This implementation differs from previous manufacturing solutions in at least the following ways. First, this pertains to a different manufacturing step (OCI performed at the end of MiniCAL line rather than in in-line with ROBAL). Secondly, this implementation uses cartridge manipulation with robotics to present the cartridge to the camera in different positions (e.g. underside from cartridge foot bottom, GX tube from one or more angles). In the final production solution, a custom work cell can be used instead to move the cartridge along conveyer belt with an indexer to track the cartridge. Third, this implementation uses deep learning tools (e.g. Cognex Vidi or other suitable software), machine learning tools (e.g. DataRobot) and an image annotation tool (e.g. Labelbox).

Figure 8:
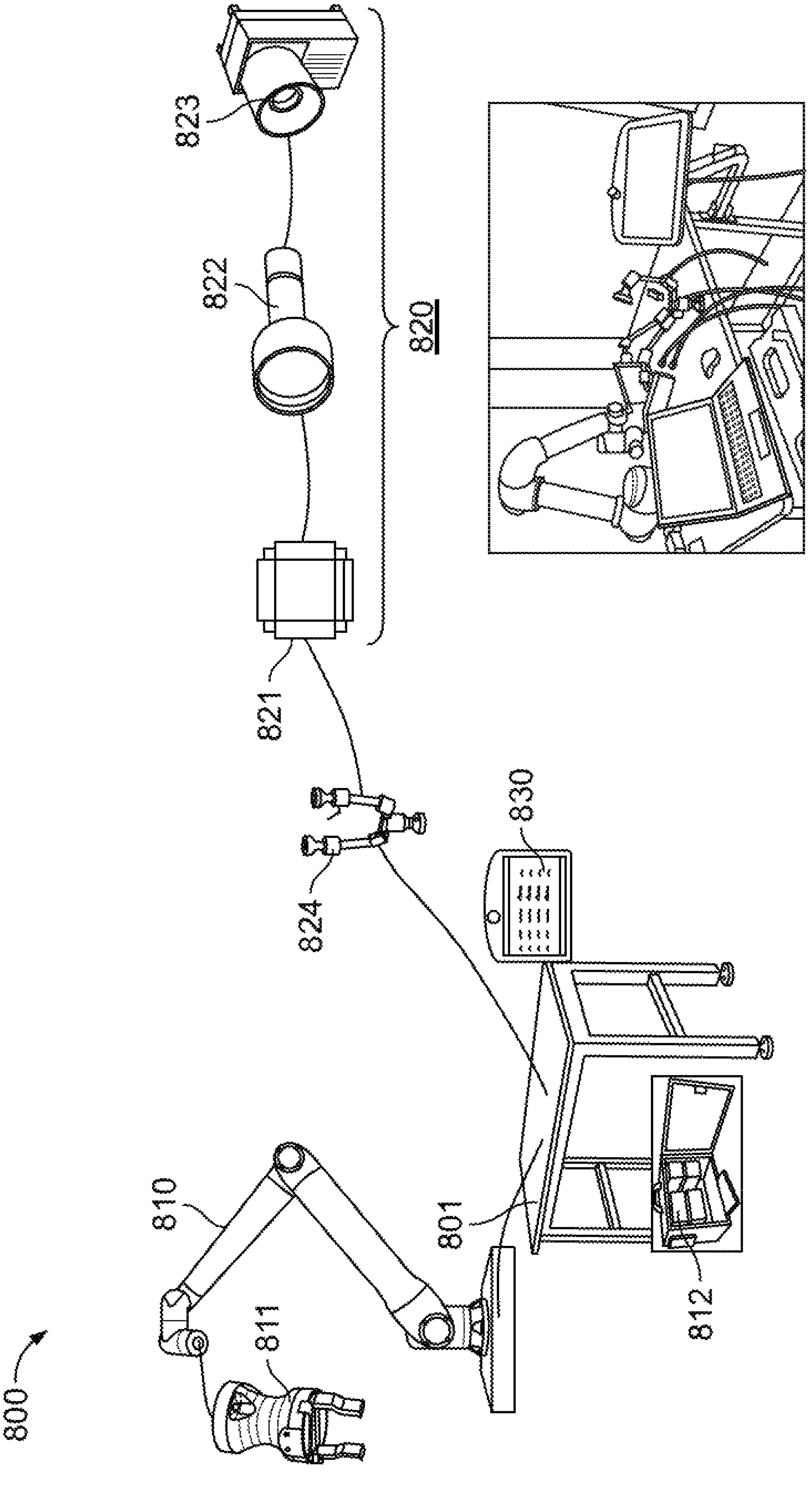
FIG. 8 shows an inspection system hardware setup using a robotic arm and a vision system, in accordance with some embodiments.

Features of the above-described implementation can be further understood by referring to FIGS. 8-15. FIG. 8 shows an inspection system hardware setup 800, in accordance with some embodiments. The setup includes a working surface 801 (e.g. worktable bench), on which is mounted a robotic arm 810 (e.g. Universal Robots UR5e Arm) with gripper hand 811 (e.g. Robotiq Hand-E) that is controlled by controller 812 (e.g. Universal Robots UR5e Controller) to pick up a cartridge having a reaction vessel attached and position the cartridge in various angles to inspection with the Vision System 820. Vision system 820 can include a light 821 (e.g. CCS QL3 light), optics 822 (e.g. Edmunds Optics telecentric lens) and an image detector 823 (e.g. IR camera, RGB camera, Cognex D905M camera), which can all be mounted on a positioning frame 824 The system further includes a deep learning module that runs on the image detector 823 configured to implement the above-described automated inspection methods. The image detector 823 and the robotic arm 810 are connected to the controller 812 via an ethernet cable and communicate with each other to capture images at the right point in time at multiple positions, and to move the cartridge to different bins depending on the result of the deep learning algorithm that runs on the image detector. The display 830 (e.g. Universal Robots Teach Pendant) is used to configure the robot and implemented the workflow of different movements. For the training process images can be collected on a remote computer (e.g. laptop) or be uploaded to the cloud. While certain hardware/software is references in this example, it is appreciated that any suitable software/hardware could be used.

Figure 9:
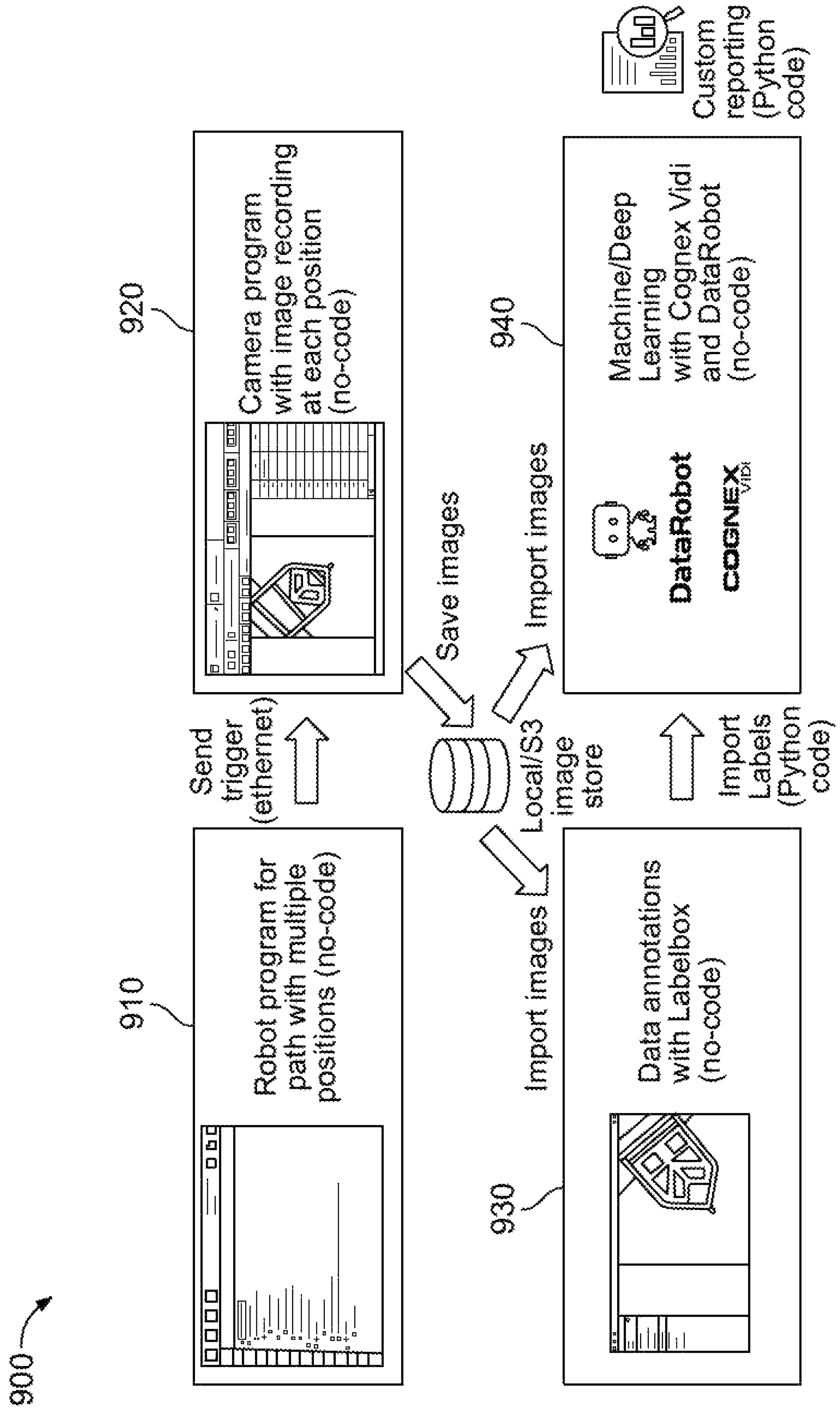
FIG. 9 shows an inspection system software workflow according to some embodiments.

FIG. 9 shows an inspection system software workflow 900 according to some embodiments. Workflow 900 includes step 910, which is a robotic program for path with multiple positions of the product being examined (e.g. reaction vessel attached to cartridges). Once the cartridge is positioned by the robotics in a desired position, this triggers the next step 920, which is a camera program with image recording at each position. The images are saved, and are stored (e.g. local on remote computer/S3 image store) and can be imported to steps 930 and 940. In step 930, the images are annoted (for each defect or pass/fail), which can utilize Labelbox or any suitable software. The data labels associated with select characteristics (e.g. defects) are determined and are imported into the step 940, which employs machine/deep learning for automated inspection. This step can use Cognex Vidi and DataRobot or any suitable software and can output a custom report of the analysis which is not captured in 930/940, which can utilize Python or any suitable software.

Figure 10:
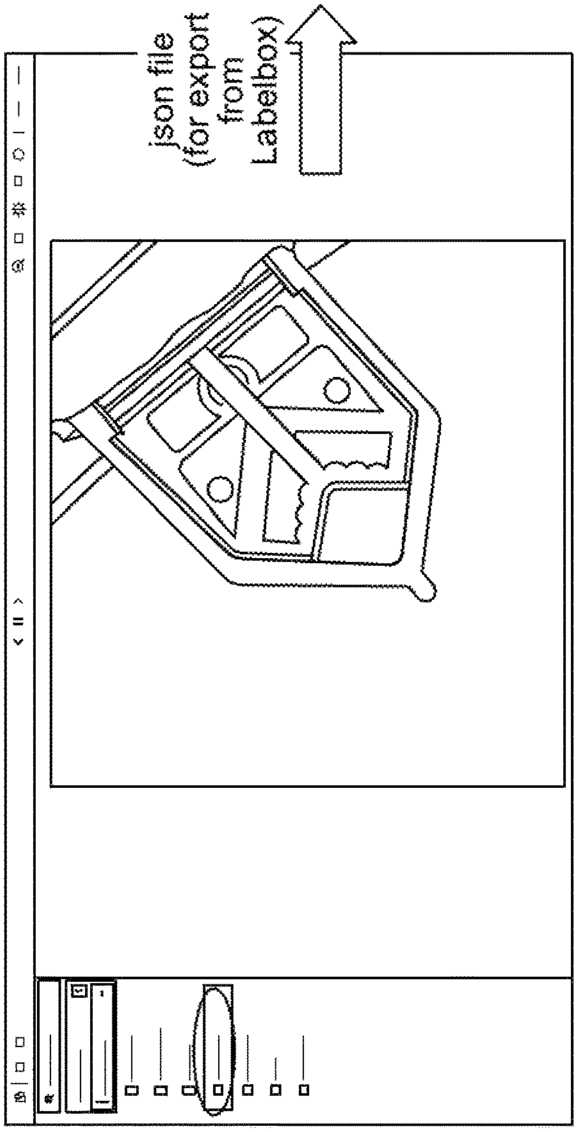
FIG. 10 shows an image annotation process/display according to some embodiments.

FIG. 10 shows an image annotation process and display 1000 (step 930 in workflow 900) according to some embodiments. The image data is imported from the local device/S3 to image annotation software, such as Labelbox or any suitable software. This allows the various defect to be identified/labeled, which can be performed with the assistance of inspection personnel at their computer locally or remotely, rather than on the production line where work conditions are more challenging. This process allows the various defects to be associated with the desired labels (e.g. binary label (e.g. PASS/FAIL) and a multi-class label (e.g. defect detail), which can be output to the Machine/Deep learning module (e.g. DataRobot and Vidi). This step can include a direct interface between the image annotation and machine/deep learning software to allow the model training together with image annotations as ground truth.

Figure 11:
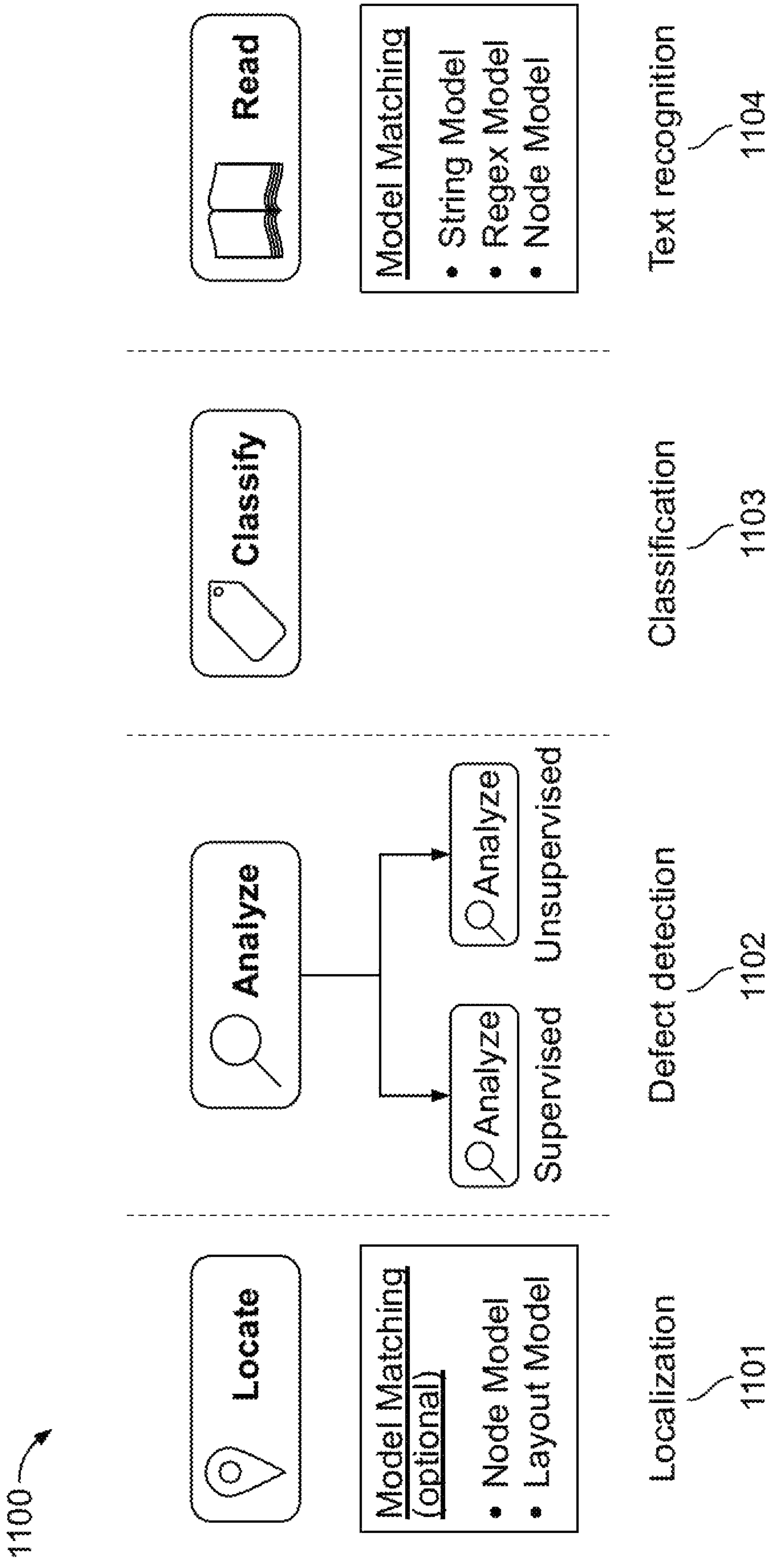
FIG. 11 shows a toolbox of various features that can be utilized in an inspection system in accordance with some embodiments.

FIG. 11 shows a toolbox of various features of the Machine/Deep learning operation 1100 (step 940 in workflow 900) that can be utilized in an inspection system in accordance with some embodiments. This operation can be performed by a Machine/Deep learning module comprising instructions recorded on a memory of a processor, the instructions can include software such as Cognex Vidi Toolbox/In-Sign Vision Suit, or any suitable software. This module uses Machine/Deep learning algorithms with pre-trained models. In some embodiments, a local GPU is used for training (e.g. 1-2 minutes on A6000). In some embodiments, the trained module can perform image inspection running on camera in real-time (e.g. <100 ms). The module can include four functions: localization 1101, which can include a node model, layout model, and optional model matching; defect detection 1102, which can include analysis steps that involves both supervised and unsupervised learning, as described previously; classification 1103 (e.g. binary and/or multi-class); and text recognition 1104, which can include model matching using any of string, model, regex model, node model or any combination thereof.

Figure 12:
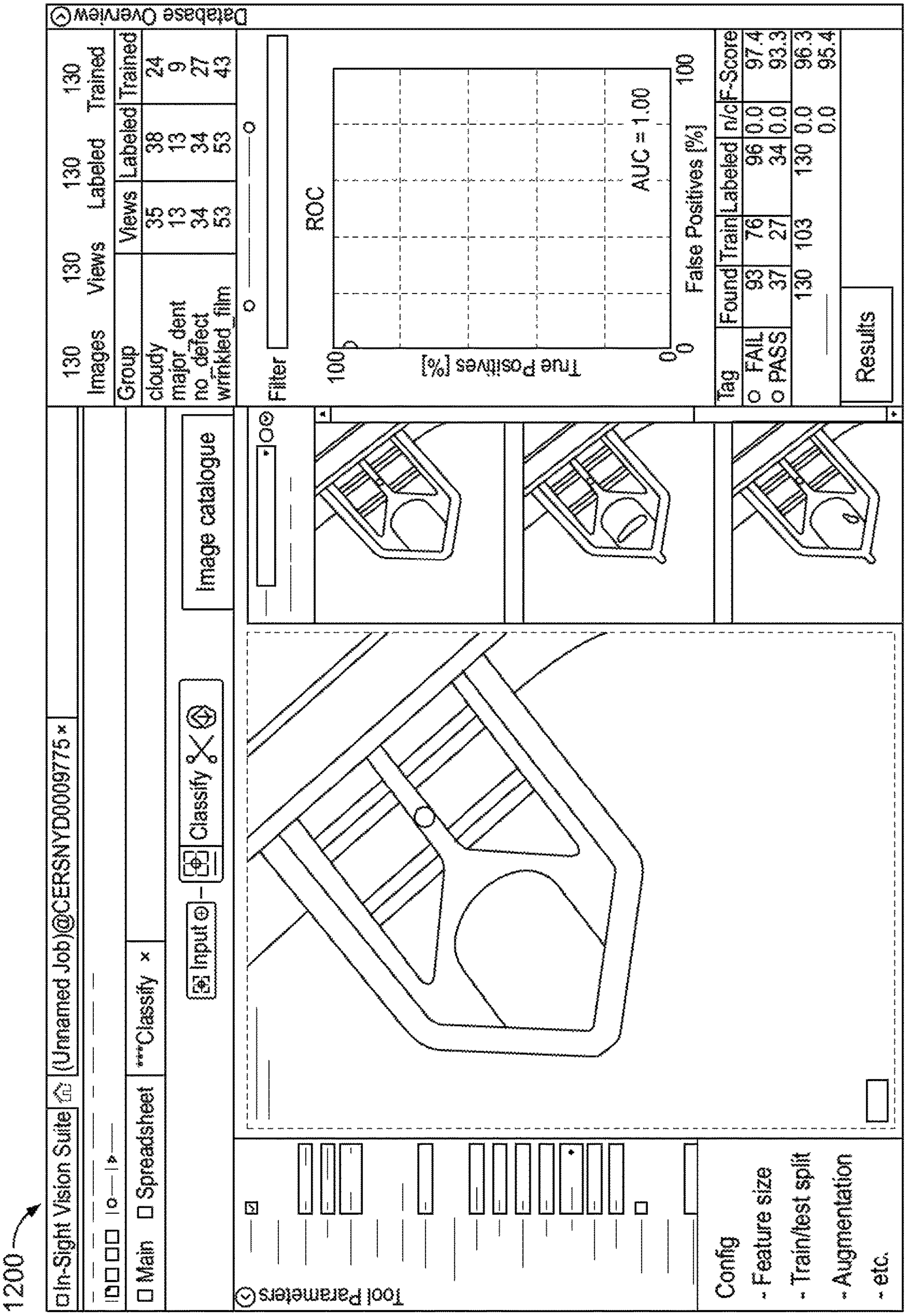
FIG. 12 shows an image classification training process and display, in accordance with some embodiments.

FIG. 12 shows an image classification training process and display 1200, in accordance with some embodiments. This process/display utilizing software instructions configured to display the image of the product being inspected for identification of features, such as defects and can utilize Cognex Vidi or any suitable software. This process/display can be configured for any of: identification of feature sizes, train/test split, augmentation to guide the training process. In some embodiments, the image of the product is compared to image from an image catalogue of target features (e.g. defect) to facilitate identification of the feature in the product. This process/display can be utilized by a data scientist/machine learning engineer in order to train the machine/deep learning module, such that once trained the module can perform the product inspection in real time without any personnel required. This process/display shows the performance metrics for a trained model (recall, precision, f1-score, Area Under the Curve AUC).

Figure 13:
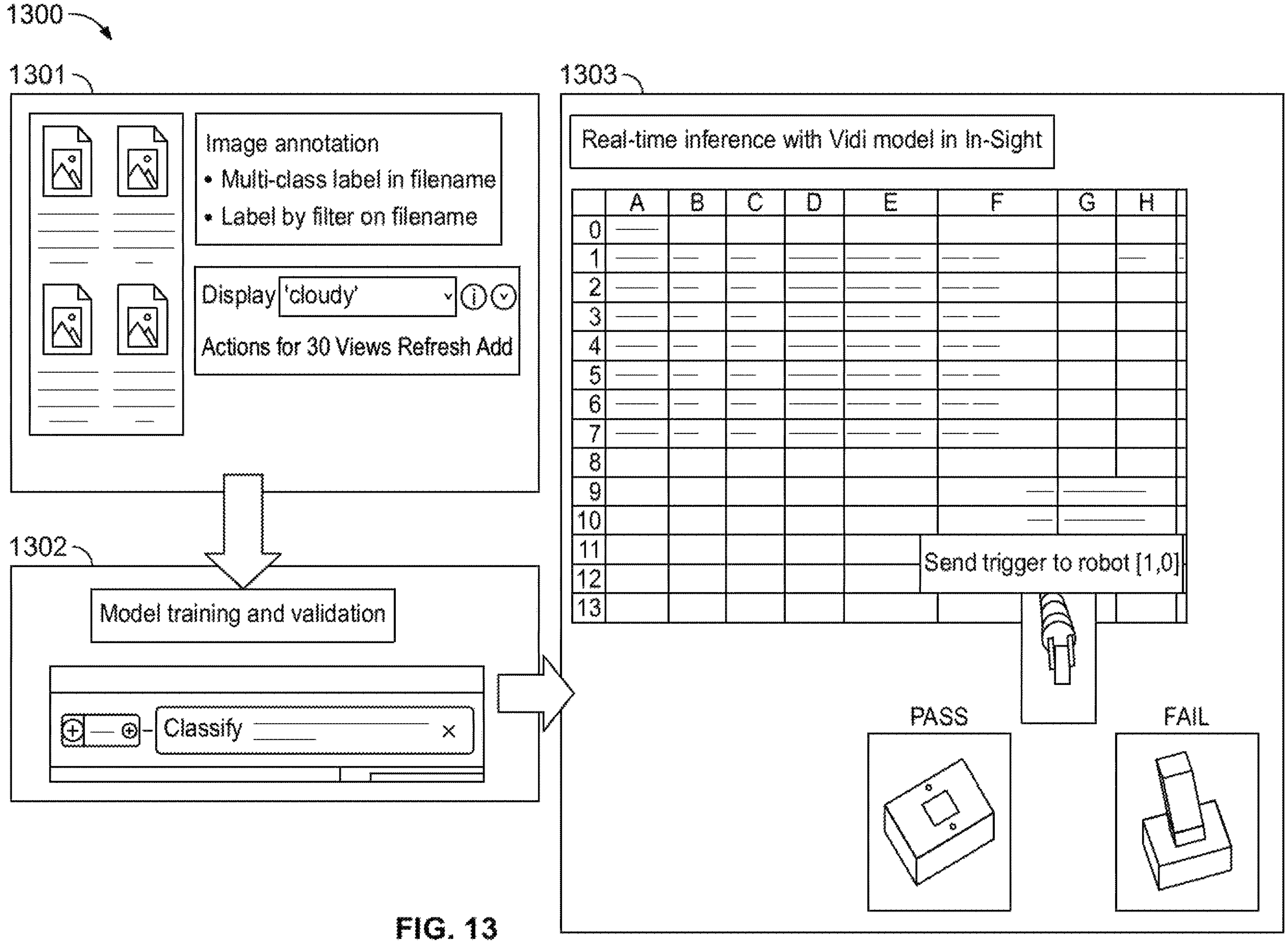
FIG. 13 shows an automated inspection workflow for real-time prediction and decision making according to some embodiments.

FIG. 13 shows an example automated inspection workflow 1300 according to some embodiments. This workflow includes a step of image annotation of inspection images 1301. In some embodiments, this entail adding multi-class labels and labels by filter in a filename. These labels are the used in model training and validation 1302 to train the Machine/Deep learning module for defect inspection. Next, the module performs automated inspection 1303 with the machine/deep learning module. In this embodiment, this entails a real-time inference using an appropriate setup (e.g. Vidi model in In-Sight). The module can in-real time identify/determine any defects and classify the cartridge (e.g., PASS/FAIL) and instruct the robotic arm to remove and discard any defective cartridges from the production line.

Figure 14:
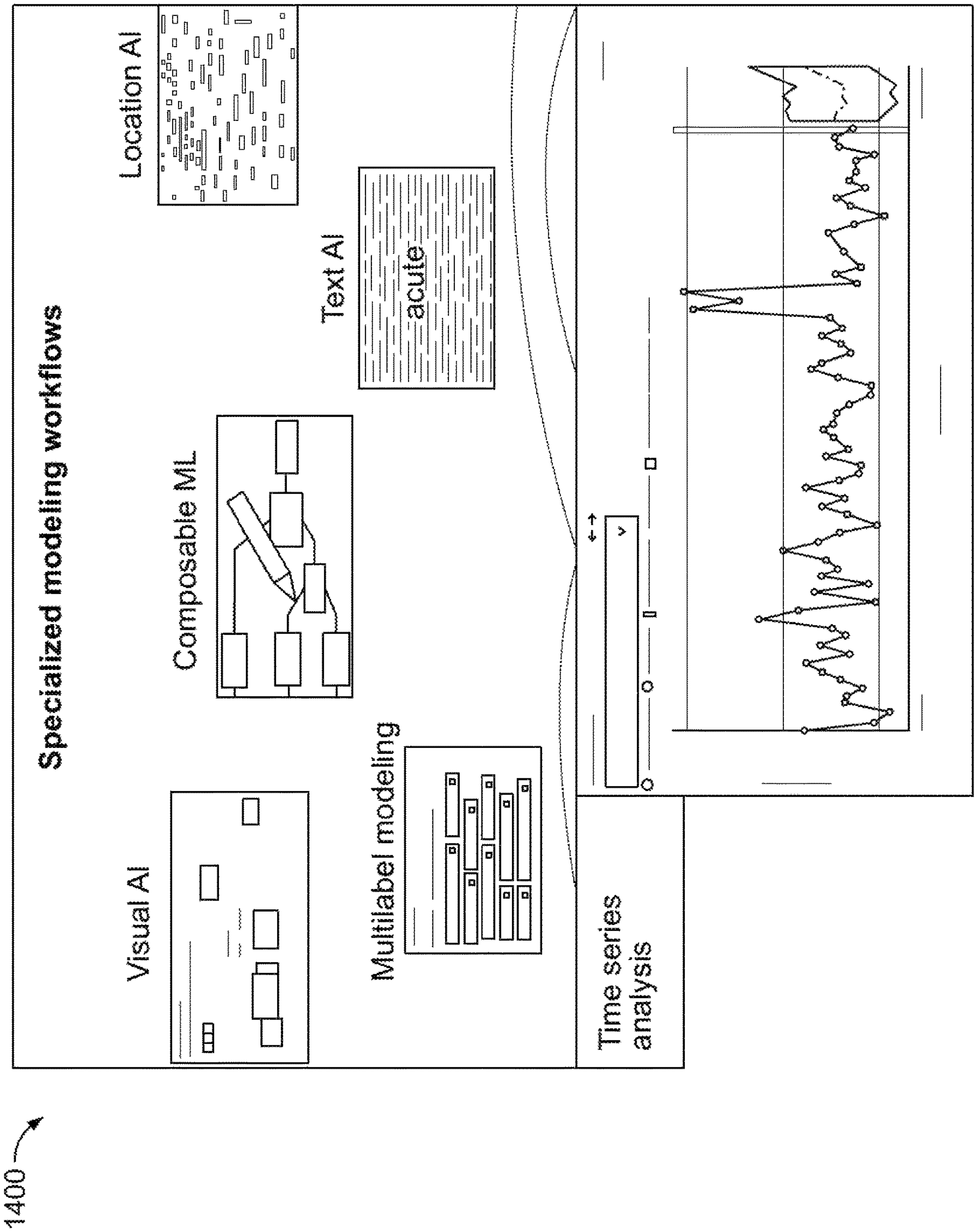
FIG. 14 shows a specialized automated modeling workflow, in accordance with some embodiments.
Figure 15:
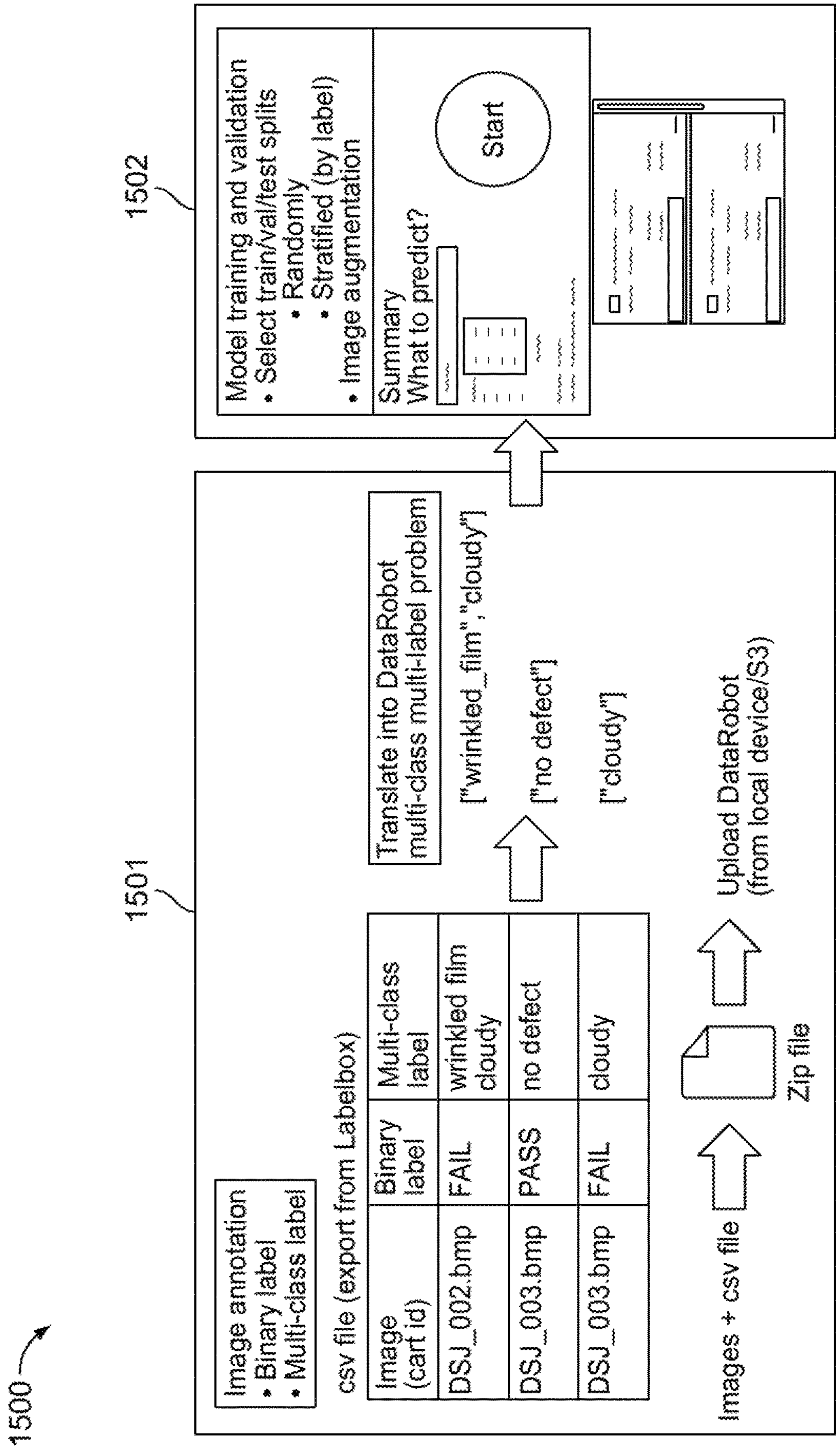
FIG. 15 shows an automated workflow for data preprocessing to make the labeled images available for model training, in accordance with some embodiments.

FIG. 14 shows specialized automated modeling workflow 1400 available in DataRobot platform, in accordance with some embodiments. In this embodiment, the workflow can be specialized to identify/analysis various other aspects. For example, the workflow can include any of visual AI, composable ML, location AI, multilabel modeling, text AI, time series analysis, or any combination thereof. While DataRobot software could be used, it is appreciated that any suitable machine learning software could utilize FIG. 15 shows an automated inspection workflow 1500, in accordance with some embodiments. This workflow can utilize AutoML software for finding the best machine learning model trying many different parameters, such as DataRobot, or any suitable software. The workflow includes a labelling step 1501 of image annotation (e.g. binary labelling and/or multi-class labelling) which is then fed into a model training/validation step 1502, which can include select training/validation/test splits (e.g. randomly and/or stratified by label), and can optionally include image augmentation or various other image enhancements to facilitate features identification, training and/or validation. The training can be performed in the DataRobot cloud platform.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art. Any references to publication, patents, or patent applications are incorporated herein by reference in their entirety for all purposes.

What is claimed is:

1. A method of training a model for defect detection of a product, the method comprising:

performing supervised transfer learning on a plurality of data sets from acceptable products, wherein the plurality of data sets from acceptable products include expert labels;

performing active learning on a plurality of data sets including both acceptable products and fail products having defects;

identifying anomalies in the plurality of data sets including both acceptable products and fail products having defects;

receiving additional expert labels for the identified anomalies; and performing supervised learning with the additional expert labels, to detect defects during manufacturing.

2. The method of claim 1 wherein the recited steps are associated with a first task, and the method is repeated for a second task that is more specific than the first task.

3. The method of claim 2 wherein the first task comprises determination of thresholds for upper and lower range limits of the product.

4. The method of claim 3 wherein the thresholds pertain to any of: feature maps, activations, predictions, and operational parameters.

5. The method of claim 2 wherein the first task is identification of a product feature, and the second task is identification of an attribute of that product feature.

6. The method of claim 5 wherein the product is a sample cartridge configured for analyzing a biological sample.

7. The method of claim 6 wherein the first task is identification of a feature of a lid of the cartridge, and the second task is an attribute of the feature.

8. The method of claim 7 wherein the feature is any of a chimney, a weld between the lid and a cartridge body, and a film seal on the lid.

9. The method of claim 2 wherein the first task is performing a product classification step utilizing image data.

10. The method of claim 1 wherein the method repeats the same steps when additional data sets from both acceptable products and fail products having defects are available.

11. The method of claim 1 wherein the model is configured for use within an automated defect detection of a sample cartridge during manufacture.

12. A method of training a model for defect detection of a product, the method comprising:

performing supervised transfer learning on a plurality of data sets from acceptable products, wherein the plurality of data sets from acceptable products include expert labels;

performing active learning on a plurality of data sets including both acceptable products and fail products having defects;

identifying anomalies in the plurality of data sets including both acceptable products and fail products having defects, wherein:

the anomalies are associated with features of a sample cartridge; and the features include one of: a chimney, a weld between a lid and a cartridge body, and an integrity of a film seal on a lid;

receiving additional expert labels for the identified anomalies; and performing supervised learning with the additional expert labels, to detect defects during manufacturing.

* * * * *